(12) United States Patent
Moon et al.

(10) Patent No.: US 8,995,368 B2
(45) Date of Patent: Mar. 31, 2015

(54) METHOD FOR TRANSMITTING CONTROL INFORMATION IN A CARRIER AGGREGATION SYSTEM, RECEIVING METHOD, AND TERMINAL

(75) Inventors: Sung Ho Moon, Anyang-si (KR); Min Seok Noh, Anyang-si (KR); Jae Hoon Chung, Anyang-si (KR); Seung Hee Han, Anyang-si (KP); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 13/514,255

(22) PCT Filed: Dec. 8, 2010

(86) PCT No.: PCT/KR2010/008738
§ 371 (c)(1),
(2), (4) Date: Jun. 6, 2012

(87) PCT Pub. No.: WO2011/071310
PCT Pub. Date: Jun. 16, 2011

(65) Prior Publication Data
US 2012/0243499 A1 Sep. 27, 2012

Related U.S. Application Data

(60) Provisional application No. 61/292,133, filed on Jan. 4, 2010, provisional application No. 61/290,888, filed (Continued)

(30) Foreign Application Priority Data

Nov. 17, 2010 (KR) .................. 10-2010-0114182

(51) Int. Cl.
*H04W 4/00* (2009.01)
*H04W 72/00* (2009.01)
(Continued)

(52) U.S. Cl.
CPC .............. *H04L 5/0091* (2013.01); *H04L 5/001* (2013.01); *H04L 5/0053* (2013.01);
(Continued)

(58) Field of Classification Search
CPC ..... H04W 72/04; H04W 88/08; H04W 76/00; H04B 17/003
USPC ........... 370/329, 344, 431, 496; 455/450, 509
See application file for complete search history.

(56) References Cited

U.S. PATENT DOCUMENTS

2009/0268630 A1* 10/2009 Yellin et al. ................... 370/252
2010/0227569 A1*  9/2010 Bala et al. ....................... 455/73
(Continued)

OTHER PUBLICATIONS

Preben E. Mogensen et al., "LTE-Advanced: The Path towards Gigabit/s in Wireless Mobile Communications", Wireless VITAE, May 2009.
(Continued)

*Primary Examiner* — Alpus H Hsu
*Assistant Examiner* — Walter Divito
(74) *Attorney, Agent, or Firm* — Lee, Hong, Degerman, Kang & Waimey

(57) ABSTRACT

A method of transmitting control information in a carrier aggregation system is provided. The method includes: transmitting bandwidth information of a component carrier; configuring downlink control information including an additional indication field and an information field; mapping the downlink control information in any one of containing units having a plurality of predetermined different bit sizes in accordance with the bandwidth information; and transmitting the downlink control information mapped to any one of the containing units, wherein the information field is any one of a plurality of control information formats applicable to the component carrier, and the additional indication field includes information indicating a specific control information format to which the information field corresponds among the plurality of control information formats. Accordingly, the number of blind decoding attempts of a user equipment can decrease in a carrier aggregation system. Therefore, power consumption of the user equipment can decrease, and a decoding rate can increase.

14 Claims, 24 Drawing Sheets

Related U.S. Application Data on Dec. 30, 2009, provisional application No. 61/286,800, filed on Dec. 16, 2009, provisional application No. 61/285,543, filed on Dec. 11, 2009, provisional application No. 61/285,137, filed on Dec. 9, 2009.

(51) Int. Cl.
*H04L 12/28* (2006.01)
*H04J 1/14* (2006.01)
*H04B 7/00* (2006.01)
*H04L 5/00* (2006.01)
*H04W 72/04* (2009.01)

(52) U.S. Cl.
CPC .................................. *H04W 72/042* (2013.01)

USPC ........... 370/329; 370/431; 370/496; 455/450; 455/509

(56) References Cited

U.S. PATENT DOCUMENTS

2011/0047441 A1* 2/2011 Yamaga ......................... 714/773
2011/0177807 A1* 7/2011 Cho et al. .................... 455/422.1

OTHER PUBLICATIONS

Robert Love et al., "Downlink Control Channel Design for 3GPP LTE", IEEE Wireless Communications and Networking Conference (WCNC 2008), pp. 813-818, Apr. 2008.
Stefan Parkvall et al., "LTE-Advanced—Evolving LTE towards IMT-Advanced", IEEE Vehicular Technology Conference, Sep. 2008.

* cited by examiner

FIG. 12
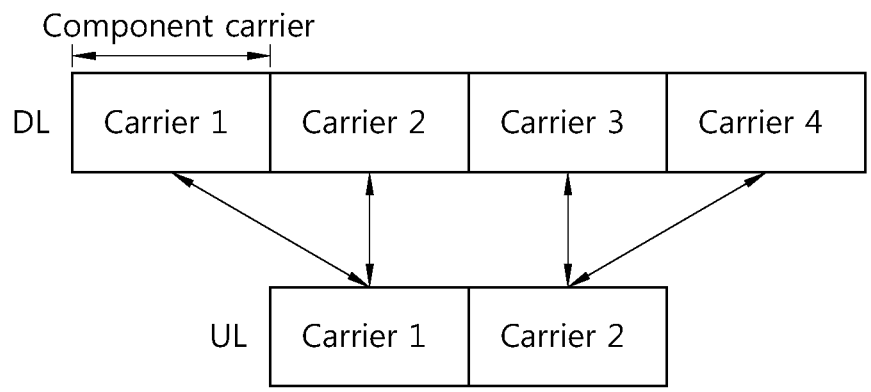
(a) # of DL CC (component carrier) ># of UL CC
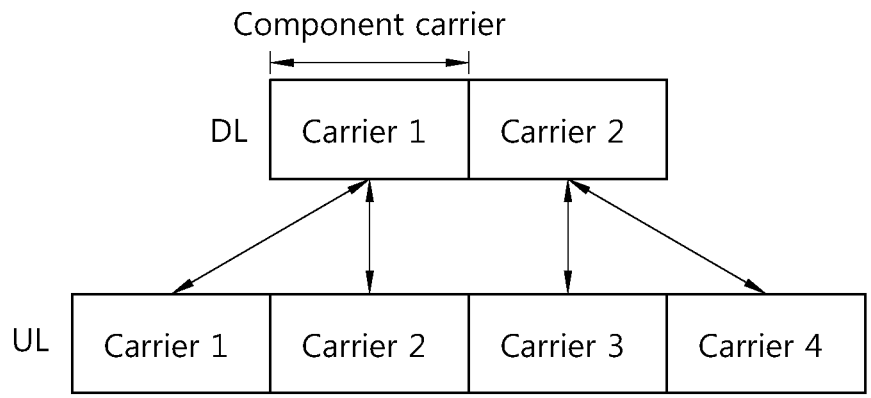
(b) # of UL CC > # of DL CC

METHOD FOR TRANSMITTING CONTROL INFORMATION IN A CARRIER AGGREGATION SYSTEM, RECEIVING METHOD, AND TERMINAL

CROSS-REFERENCE TO RELATED APPLICATIONS

This application is the National Stage filing under 35 U.S.C. 371 of International Application No. PCT/KR2010/008738, filed on Dec. 8, 2010, which claims the benefit of earlier filing date and right of priority to Korean Patent Application No. 10-2010-0114182, filed on Nov. 17, 2010, and also claims the benefit of U.S. Provisional Application Ser. Nos. 61/285,137, filed on Dec. 9, 2009, 61/285,543, filed on Dec. 11, 2009, 61/286,800, filed on Dec. 16, 2009, 61/290,888, filed on Dec. 30, 2009, and 61/292,133, filed on Jan. 4, 2010, the contents of which are all incorporated by reference herein in their entirety.

TECHNICAL FIELD

The present invention relates to wireless communications, and more particularly, to a method of transmitting control information in a carrier aggregation system, a method of receiving the control information, and a user equipment for receiving the control information according to the methods.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a wideband bandwidth in order to satisfy a required higher data rate, a system is designed to satisfy a basic requirement which requires separate bands capable of operating respective independent systems, and a carrier aggregation (CA) is introduced. In concept, the CA aggregates a plurality of bands into one system. In this case, a band that can be independently managed is defined as a component carrier (CC).

To support growing transmission capacity, the 3GPP LTE or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz.

As such, a plurality of CCs are used in the carrier aggregation system. A method of receiving control information of a user equipment (UE) may be problematic in the carrier aggregation system. In the conventional system using a single carrier, for example, in an LTE system, the UE first receives a system band of the carrier, the number of antenna ports, a transmission mode, etc., from a base station (BS) as system information, and then performs blind decoding on control information. That is, the UE performs decoding in accordance with the number of various cases and receives/confirms control information of the UE by using cyclic redundancy check (CRC) or the like in a state where the UE does not know an exact control information format transmitted in a control region of a subframe and does not know a specific station from which control information is transmitted. When the conventional method of receiving control information is equally applied to the carrier aggregation system, the number of blind decoding attempts of the UE may increase, which may result in a problem such as power consumption of the UE, decrease in a decoding rate, etc.

Accordingly, there is a need for a method for transmitting control information of a BS in a carrier aggregation system, a method for receiving control information of a UE, and the UE using the methods.

SUMMARY OF INVENTION

Technical Problem

The present invention provides a method of transmitting control information in a carrier aggregation system, a method of receiving control information, and a user equipment for receiving control information according to the methods.

Technical Solution

According to an aspect of the present invention, a method of transmitting control information in a carrier aggregation system is provided. The method includes: transmitting bandwidth information of a component carrier; configuring downlink control information including an additional indication field and an information field; mapping the downlink control information in any one of containing units having a plurality of predetermined different bit sizes in accordance with the bandwidth information; and transmitting the downlink control information mapped to any one of the containing units, wherein the information field is any one of a plurality of control information formats applicable to the component carrier, and the additional indication field includes information indicating a specific control information format to which the information field corresponds among the plurality of control information formats.

According to another aspect of the present invention, a method of receiving control information of a user equipment in a carrier aggregation system is provided. The method includes: receiving bandwidth information of a component carrier; and receiving downlink control information by monitoring containing units having a plurality of predetermined different bit sizes in accordance with the bandwidth information, wherein the downlink control information is mapped to any one of the containing units having the plurality of predetermined different bit sizes, and wherein the downlink control information includes an additional indication field and an information field, the information field is any one of a plurality of control information formats applicable to the component carrier, and the additional indication field includes information indicating a specific control information format to which the information field corresponds among the plurality of control information formats.

According to another aspect of the present invention, a user equipment in a carrier aggregation system is provided. The user equipment includes: a radio frequency (RF) unit transmitting and receiving a radio signal; and a processor coupled to the RF unit, wherein the processor is configured for receiving bandwidth information of a component carrier and receives downlink control information by monitoring containing units having a plurality of predetermined different bit sizes in accordance with the bandwidth information, wherein the downlink control information is mapped to any one of the containing units having the plurality of predetermined different bit sizes, and wherein the downlink control information includes an additional indication field and an information field, the information field is any one of a plurality of control information formats applicable to the component carrier, and the additional indication field includes information indicating a specific control information format to which the information field corresponds among the plurality of control information formats.

Advantageous Effects

According to the present invention, the number of blind decoding attempts of a user equipment can decrease in a carrier aggregation system. Therefore, power consumption of the user equipment can decrease, and a decoding rate can increase.

DESCRIPTION OF DRAWINGS

FIG. 12 is an example of a downlink (DL)/uplink (UL) asymmetric carrier aggregation system to which the present invention is applicable.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

For clarity, the following description assumes a situation where the present invention applies to an LTE-A system. However, technical features of the present invention are not limited thereto.

Figure 1:
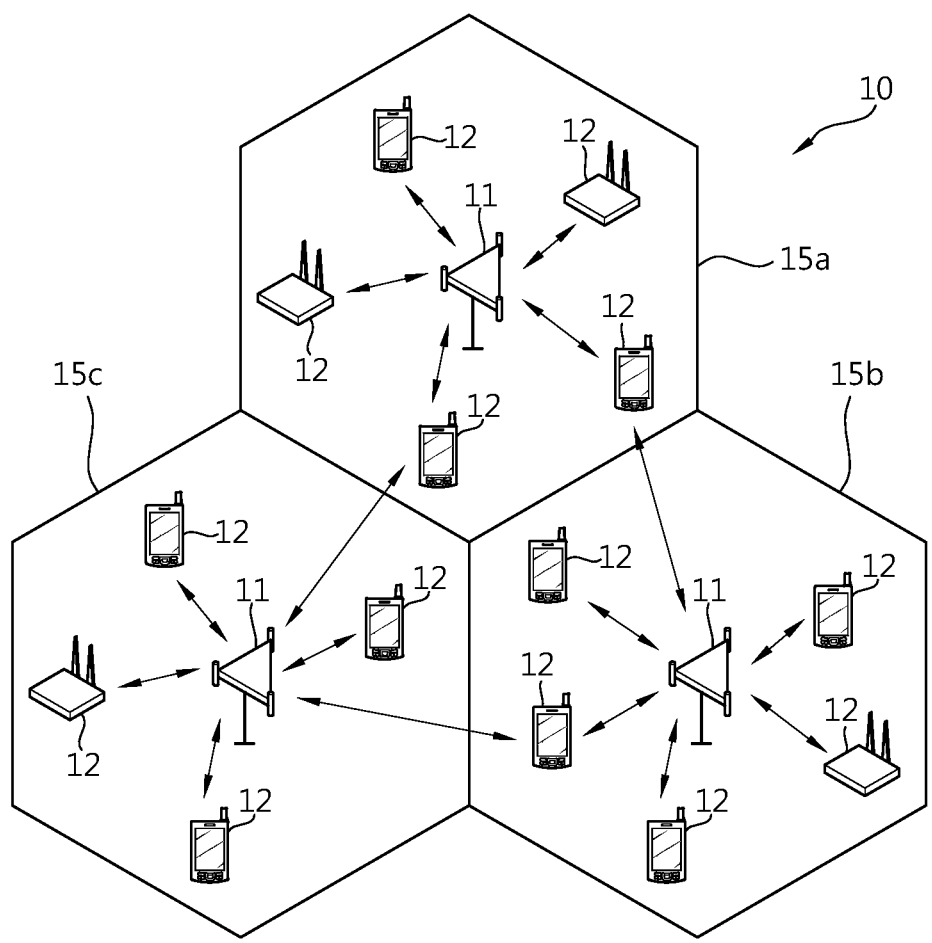
FIG. 1 is an example of a wireless communication system according to an embodiment of the present invention.

FIG. 1 is an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), an mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service through the serving cell is called a serving BS. Since the wireless communication system is a cellular system, there is a different cell adjacent to the serving cell. The different cell adjacent to the serving cell is called a neighboring cell. A BS which provides a communication service to the adjacent cell is called a neighbor BS. The serving cell and the neighbor cell are determined relatively with respect to the UE.

In general, a downlink implies communication from the BS 11 to the UE 12, and an uplink implies communication from the UE 12 to the BS 11.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

A Tx antenna implies a physical or logical antenna used to transmit one signal or stream. An Rx antenna implies a physical or logical antenna used to receive one signal or stream.

Figure 2:
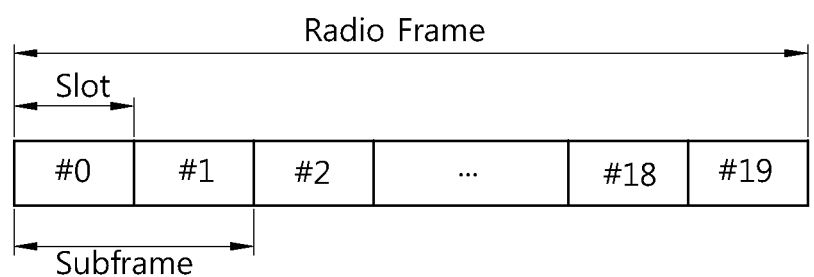
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP (3rd Generation Partnership Project) TS 36.211 V8.2.0 (March 2008) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. The OFDM symbol is for representing one symbol period. The OFDM symbol can be referred to as other terms. For example, the OFDM symbol can also be referred to as an orthogonal frequency division multiple access (OFDMA) symbol or, when single carrier-frequency division multiple access (SC-FDMA) is used as an uplink multiple-access scheme, can also be referred to as an SC-FDMA symbol.

In 3GPP LTE, it is defined such that one slot includes 7 OFDM symbols in a normal cyclic prefix (CP) and one slot includes 6 OFDM symbols in an extended CP.

The above radio frame structure is shown for exemplary purposes only. Thus, the number of subframes included in the radio frame or the number of slots included in the subframe or the number of OFDM symbols included in the slot may change variously.

Figure 3:
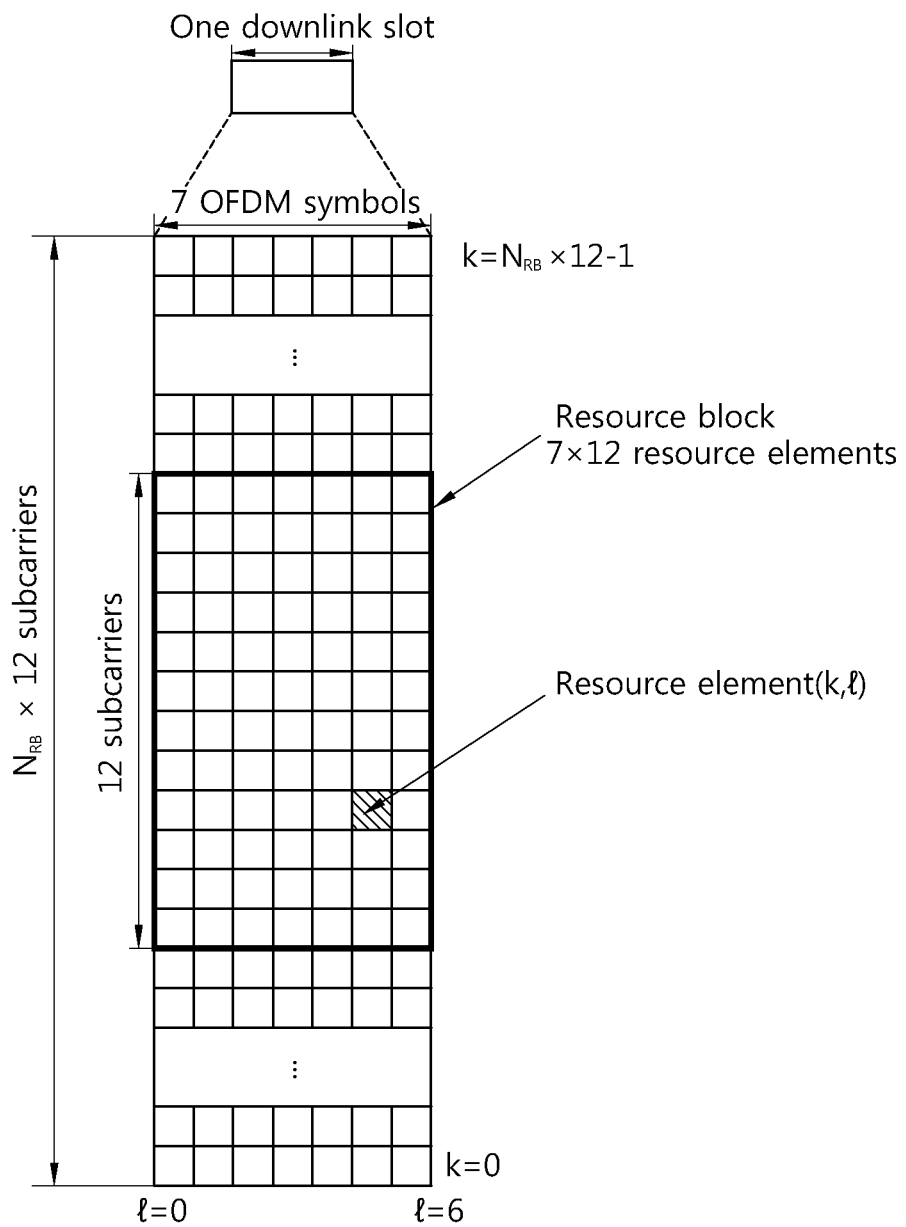
FIG. 3 shows an example of a resource grid for one downlink slot.

FIG. 3 shows an example of a resource grid for one downlink slot.

The downlink slot includes a plurality of OFDM symbols in a time domain and a plurality of $N_{RB}$ resource blocks (RBs) in a frequency domain. The RB is a resource allocation unit, and includes one slot in the time domain and a plurality of contiguous subcarriers in the frequency domain.

The number $N_{RB}$ of RBs included in the downlink slot depends on a downlink transmission bandwidth determined in a cell. For example, in an LTE system, $N_{RB}$ may be any one value in the range of 60 to 110. An uplink slot may have the same structure as the downlink slot.

Each element on the resource grid is referred to as a resource element (RE). The RE on the resource grid can be identified by an index pair (k, l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
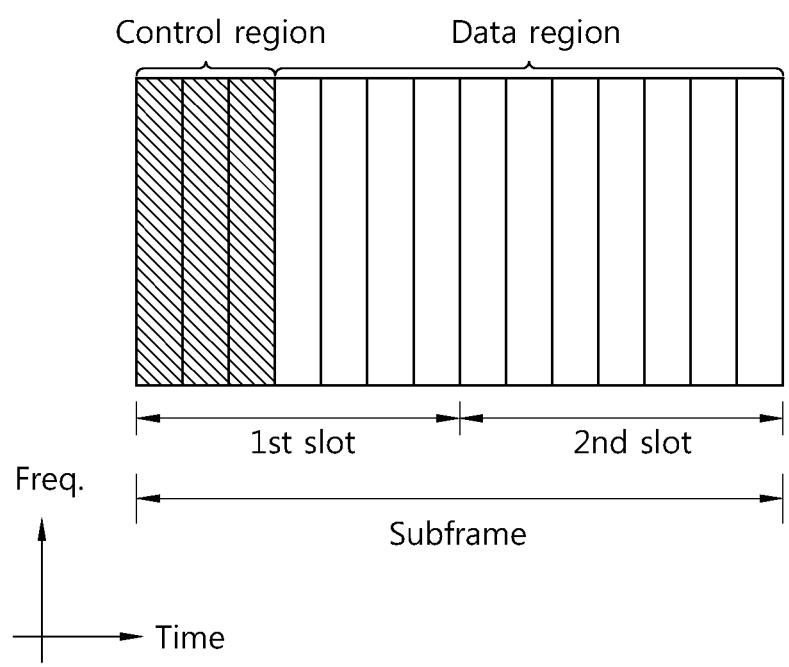
FIG. 4 shows a structure of a downlink subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel in which a BS transmits data to a UE.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

Figure 5:
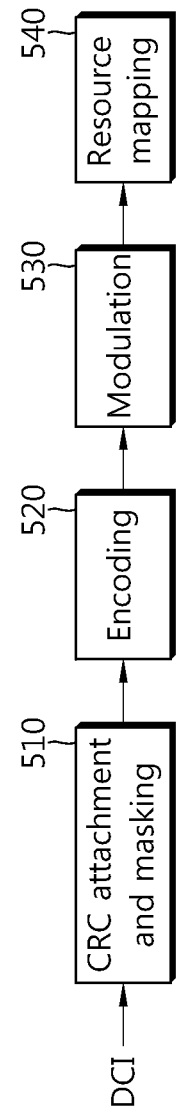
FIG. 5 shows a physical downlink control channel (PDCCH) configuration.

FIG. 5 shows a PDCCH configuration.

ABS determines a PDCCH format according to DCI to be transmitted to a UE, attaches a cyclic redundancy check (CRC) to control information, and masks a unique identifier (referred to as a radio network temporary identifier (RNTI)) to the CRC according to an owner or usage of the PDCCH (step 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (such information is called UE-specific control information), and when other RNTIs are used, the PDCCH carries common control information received by all or a plurality of UEs in a cell.

The CRC-attached DCI is encoded to generate coded data (step 520). Encoding includes channel encoding and rate matching.

The coded data is modulated to generate modulation symbols (step 530).

The modulation symbols are mapped to physical resource elements (REs) (step 540). The modulation symbols are respectively mapped to the REs.

Figure 6:
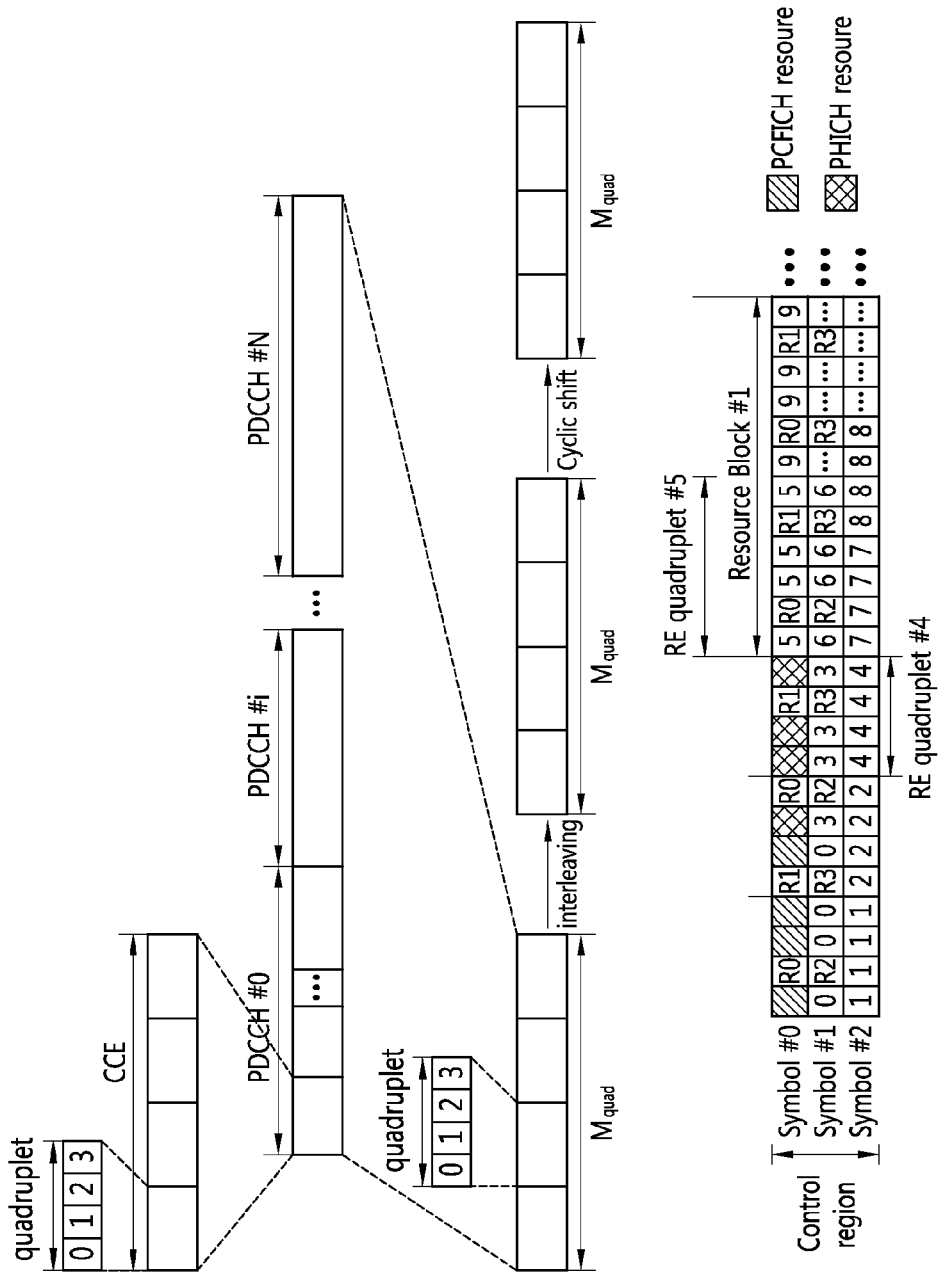
FIG. 6 shows exemplary resource mapping of a PDCCH.

FIG. 6 shows exemplary resource mapping of a PDCCH.

The section 6.8 of 3GPP TS 36.211 V8.5.0 (December 2008) may be incorporated herein by reference. R0 denotes a reference signal of a $1^{st}$ antenna. R1 denotes a reference signal of a $2^{nd}$ antenna. R2 denotes a reference signal of a $3^{rd}$ antenna. R3 denotes a reference signal of a $4^{th}$ antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruplet in the drawing) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

Figure 7:
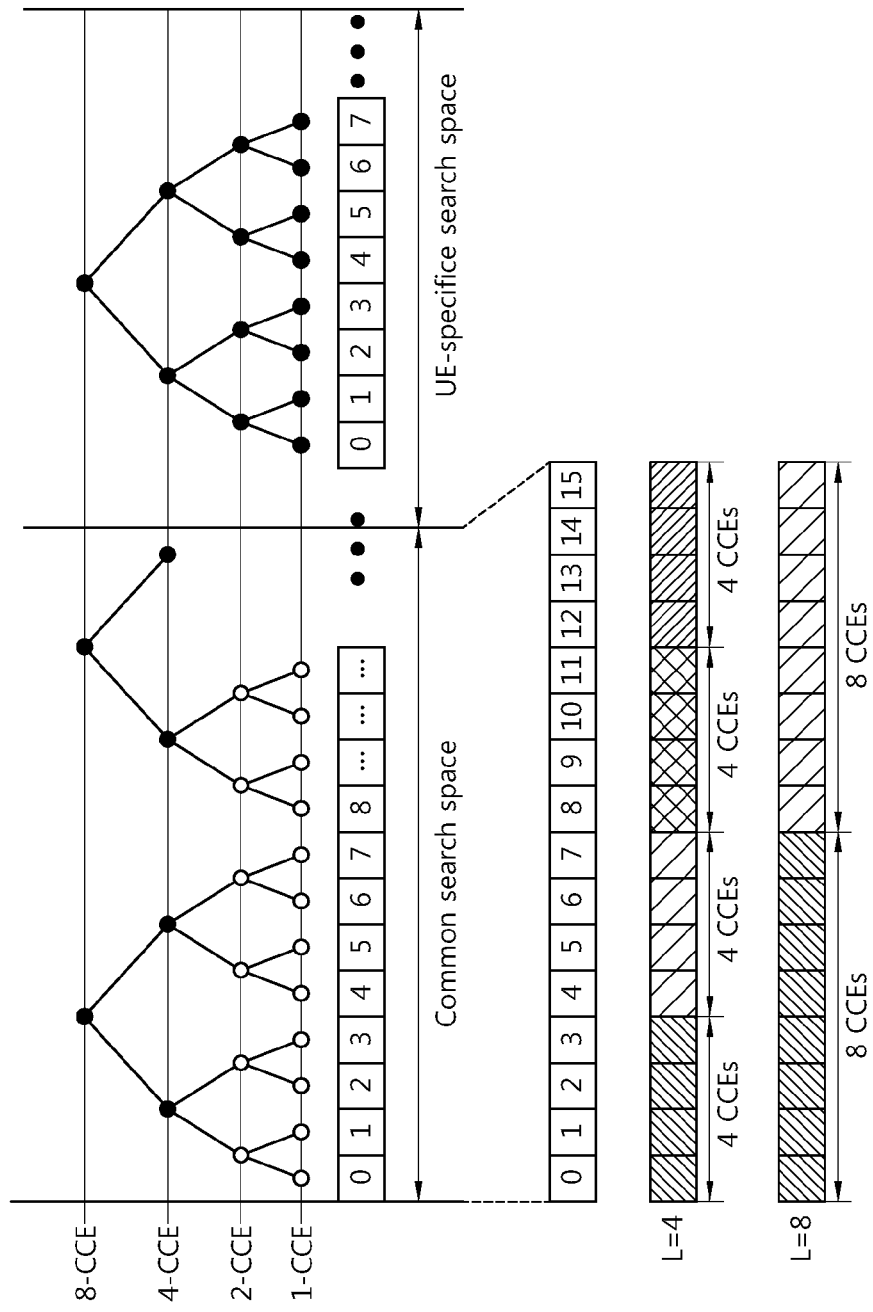
FIG. 7 is an example showing monitoring of a PDCCH.

FIG. 7 is an example showing monitoring of a PDCCH. The section 9 of 3GPP TS 36.213 V8.5.0 (December 2008) can be incorporated herein by reference. The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. The UE cannot know about a specific position in a control region in which its PDCCH is transmitted and about a specific CCE aggregation or DCI format used for PDCCH transmission.

A plurality of PDCCHs can be transmitted in one subframe. The UE monitors a plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space can be called a monitoring set of CCEs for the PDCCH. The UE monitors the PDCCH within the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

The conventional DCI formats transmitted through the PDCCH will be described.

A DCI format includes fields described below, and the respective fields can be mapped to information bits $a_0$ to $a_{A-1}$. The respective fields can be mapped in the same order as described in the respective DCI formats. Each field may have zero-padding bits. A first field can be mapped to an information bit $a_0$ having a lowest order, and consecutive other fields can be mapped to information bits having higher orders. In each field, a most significant bit (MBS) can be mapped to an information bit having a lowest order of a corresponding field. For example, an MSB of the first field can be mapped to $a_0$. Hereinafter, a set of fields included in the respective conventional DCI formats is called an information field.

1. DCI Format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a DL designation index (only in a TDD), 10) CQI request, etc. If the number of information bits in the DCI format 0 is less than a payload size of the DCI format 1A, '0' is padded so that it is equal to the payload size of the DCI format 1A.

2. DCI Format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a DL designation index (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI Format 1A

A DCI format 1A is used for compact scheduling of one PDSCH codeword or a random access process.

Examples of information transmitted in the DCI format 1A are as follows. 1) a flag for identifying the DCI format 0 and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DL designation index (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI Format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI Format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI Format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) TPMI information for precoding, 10) a DL power offset, etc. If the number of information bits in the DCI format 1D is equal to any one of {12, 14, 16, 20, 24, 26, 32, 40, 44, 56}, a bit having one value of '0' is added to the DCI format 1D.

7. DCI Format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DL designation index (only in a TDD), 5) an HARQ process number, 6) a transport block to codeword swap flag, 7) a modulation and coding scheme, 8) a new data indicator, 9) a redundancy version, 10) precoding information, etc.

8. DCI Format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DL designation index (only in a TDD), 4) an HARQ process number, 5) a transport block to codeword swap flag, 6) a modulation and coding scheme, 7) a new data indicator, 8) a redundancy version, 9) precoding information, etc.

9. DCI Format 3

A DCI format 3 is used to transmit a TPC command for a PUCCH and a PUSCH through 2-bit power regulation. Examples of information transmitted in the DCI format 3 are as follows.

1) N transmit power control (TPC) commands. Herein, N is determined by Equation 1 below.

$$N = \left\lfloor \frac{L_{format\,0}}{2} \right\rfloor \quad \text{[Equation 1]}$$

Herein, $L_{format0}$ is equal to a payload size of a DCI format 0 before CRC is attached. If floor($L_{format0}/2$) is less than $L_{format0}/2$, one bit having a value of '0' is added.

10. DCI Format 3A

A DCI format 3A is used to transmit a TPC command for a PUCCH and a PUSCH through 1-bit power regulation. Examples of information transmitted in the DCI format 3A are as follows.

1) M TPC commands. Herein, M is equal to a payload size of a DCI format 0 before CRC is attached.

The section 5.3.3.1 of 3GPP TS 36.212 V8.7.0 (May 2009) can be incorporated herein to describe the DCI formats.

A DL transmission mode between a BS and a UE can be classified into 7 modes as follows.

1. A single antenna port: Precoding is not performed in this mode.
2. Transmit diversity: Transmit diversity can be used in 2 or 4 antenna ports using SFBC.
3. Open-loop spatial multiplexing: This is an open-loop mode in which rank adaptation based on RI feedback is possible. The transmit diversity is applicable when a rank is 1. A great delay CDD can be used when the rank is greater than 1.
4. Closed-loop spatial multiplexing: This is a mode in which precoding feedback supporting dynamic rank adaptation is applied.
5. Multi-user MIMO
6. Closed-loop rank-1 precoding
7. Single-antenna port: This is a mode that can be used for beamforming when a UE-specific reference signal is used.

Table 1 below shows an example of a DCI format to be monitored by a UE according to the aforementioned DL transmission mode.

TABLE 1

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |

TABLE 1-continued

| Transmission mode | DCI format to be monitored |
| --- | --- |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

Table 2 below shows an example of the number of blind decoding attempts of the UE.

TABLE 2

| Search Space Type | Aggregation level L | Size [In CCEs] | Number of PDCCH candidates | DCI formats | # of blind decodings |
| --- | --- | --- | --- | --- | --- |
| UE-specific | 1 | 6 | 6 | 0, 1, 1A, 1B, 1D, 2, 2A | (6 + 6 + 2 + 2) * 2 = 32 |
| | 2 | 12 | 6 | | |
| | 4 | 8 | 2 | | |
| | 8 | 16 | 2 | | |
| Common | 4 | 16 | 4 | 0, 1A, 1C, 3/3A | (4 + 2) * 2 = 12 |
| | 8 | 16 | 2 | | |

As shown in Table 2, the UE may have to perform up to 44 blind decoding attempts. The UE receives information regarding a bandwidth of a carrier, a transmission mode, the number of antenna ports, etc., through system information from the BS, and thus can known in advance a payload size of a PDCCH to be detected when performing blind decoding. The UE performs 44 blind decoding attempts in total, i.e., 32 (i.e., 16×2=32) attempts in a UE-specific search space and 12 (i.e., 6×2=12) attempts in a common search space, for each of a DL and a UL with respect to the pre-known payload size of the PDCCH.

Figure 8:
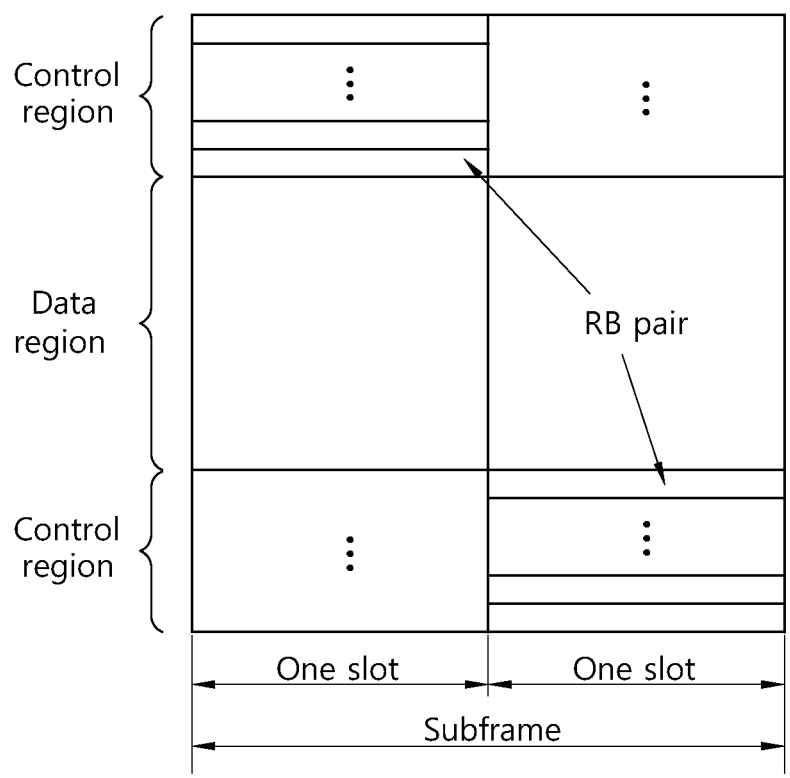
FIG. 8 shows a structure of an uplink subframe.

FIG. 8 shows a structure of a UL subframe.

The UL subframe can be divided into a control region and a data region in a frequency domain. A physical uplink control channel (PUCCH) for transmitting UL control information is allocated to the control region. A physical uplink shared channel (PUSCH) for transmitting data is allocated to the data region. To maintain a single-carrier property, a UE does not simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits UL control information over time through different subcarriers, a frequency diversity gain can be obtained.

Examples of UL control information transmitted on the PUCCH include hybrid automatic repeat request (HARQ) acknowledgement (ACK)/non-acknowledgment (NACK), a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the UL data may consist of only control information.

In the LTE-A system, an SC-FDMA transmission scheme is applied in a UL. SC-FDMA is a transmission scheme in which IFFT is performed after DFT spreading is performed. The SC-FDMA is also called DFT-spread OFDM (DFT-s OFDM). A peak-to-average power ratio (PAPR) or a cubic metric (CM) can decrease in the SC-FDMA. When using the SC-FDMA transmission scheme, a non-linear distortion duration of a power amplifier can be avoided and thus transmit power efficiency can increase in a UE in which power consumption is limited. Accordingly, a user throughput can increase.

Meanwhile, a 3GPP LTE-A system supports a carrier aggregation system. 3GPP TR 36.815 V9.0.0 (March 2010) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in a UL is equal to the number of carriers used in a DL, it is necessary to configure such that all CCs are compatible with the LTE Rel-8 system.

In order to efficiently use a plurality of carriers, the plurality of carriers can be managed by media access control (MAC).

Figure 9:
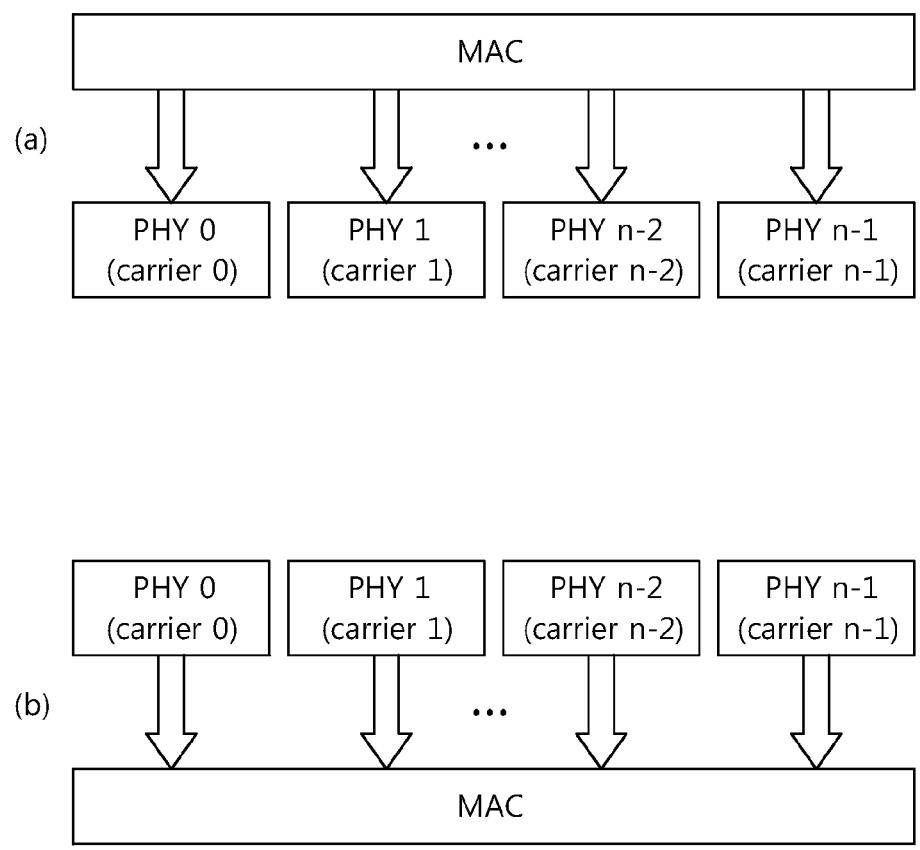
FIG. 9 shows an example of a base station (BS) and a user equipment (UE) which constitute a carrier aggregation system.

FIG. 9 shows an example of a BS and a UE which constitute a carrier aggregation system.

In the BS of FIG. 9(a), one MAC transmits and receives data by managing and operating all of n carriers. This is also applied to the UE of FIG. 9(b). From the perspective of the UE, one transport block and one HARQ entity may exist per CC. The UE can be scheduled simultaneously for a plurality of carriers. The carrier aggregation system of FIG. 9 can apply both to a contiguous carrier aggregation system and a non-contiguous carrier aggregation system. The respective carriers managed by one MAC do not have to be contiguous to each other, which results in flexibility in terms of resource management.

Figure 10:
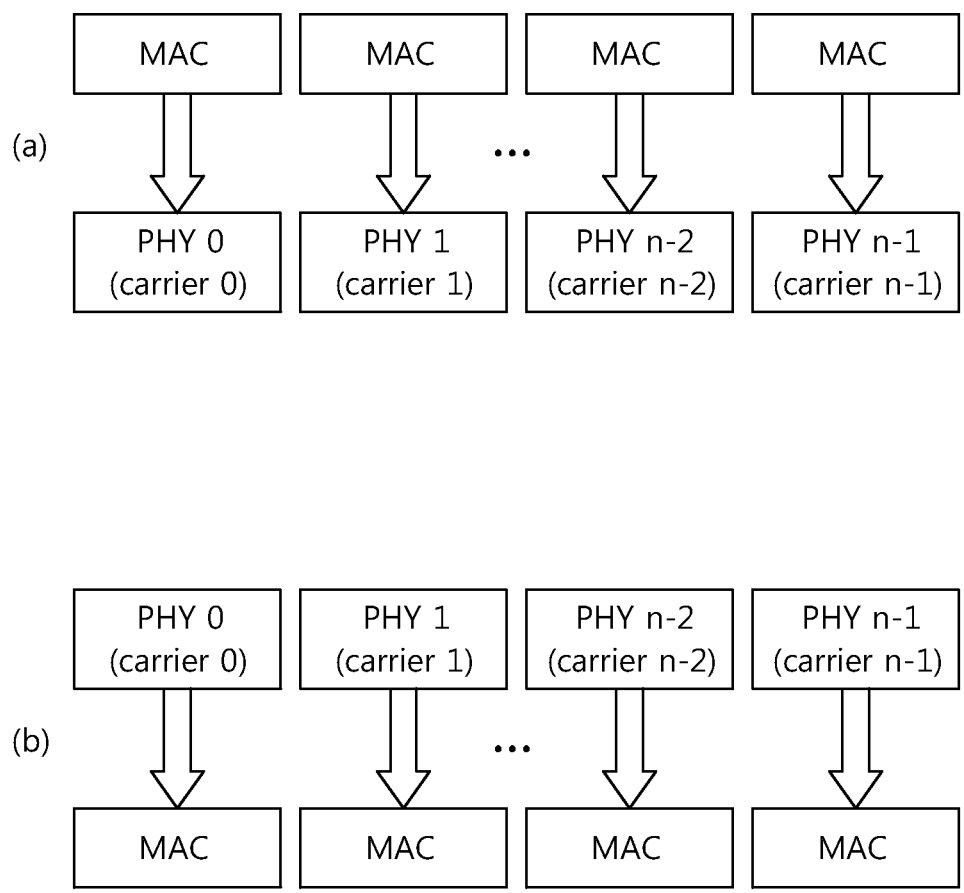
FIG. 10 and FIG. 11 show other examples of a BS and a UE which constitute a carrier aggregation system.
Figure 11:
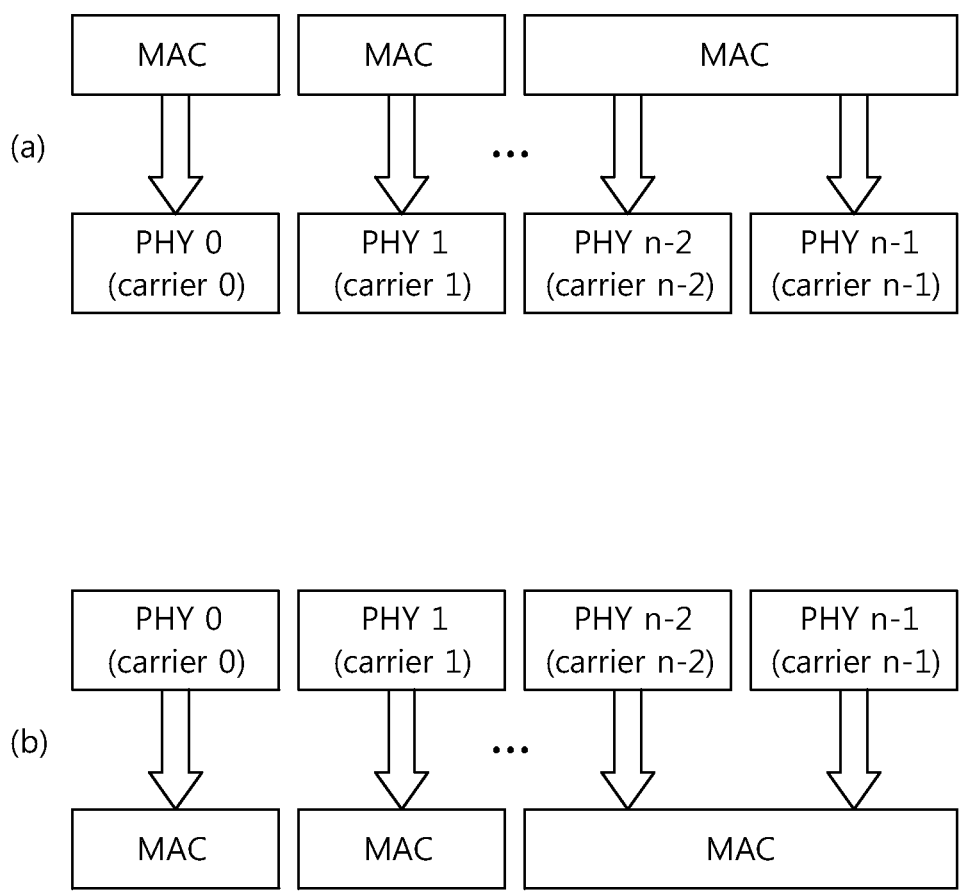

FIG. 10 and FIG. 11 show other examples of a BS and a UE which constitute a carrier aggregation system.

In the BS of FIG. 10(a) and the UE of FIG. 10(b), one MAC manages only one carrier. That is, the MAC and the carrier are 1:1 mapped. In the BS of FIG. 11(a) and the UE of FIG. 11(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 9 to FIG. 11 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, a plurality of carriers can be used by dividing them for a UL usage and a DL usage. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

FIG. 12 is an example of a DL/UL asymmetric carrier aggregation system to which the present invention is applicable.

FIG. 12(a) shows a case where the number of DL CCs is greater than the number of UL CCs, and FIG. 12(b) shows a case where the number of UL CCs is greater than the number of DL CCs. Although FIG. 12(a) shows a case where two DL CCs are linked to one UL CC and FIG. 12(b) shows a case where one DL CC is linked to two UL CCs, the number of CCs constituting a DL and a UL and a linkage ratio of the DL CC and the UL CC can change variously according to a carrier aggregation system to which the present invention is applied, and the content proposed in the present invention can also apply to a symmetric carrier aggregation system in which a CC constituting the DL and a CC constituting the UL are 1:1 linked.

A carrier having backward compatibility in the LTE-A system is accessible by the conventional UE by considering compatibility with UEs of the conventional 3GPP LTE system, and can function as independent one carrier or as a part of carrier aggregation. The carrier having backward compatibility is always configured in a pair form of the DL and the UL in an FDD system. For this, a carrier not having backward compatibility is not accessible to the conventional UE since the carrier is newly defined without considering compatibility with UEs operating in the conventional LTE system. An extension carrier cannot function as one independent carrier, and is a carrier which functions as a part of a CC set including a carrier capable of functioning as one independent carrier.

In a carrier aggregation system, a cell-specific or/and UE-specific method can be taken into account as a form of using one or a plurality of carriers. In the following description of the present invention, the cell-specific method implies a carrier configuration from the perspective of any cell or BS and the UE-specific method implies a carrier configuration from the perspective of a UE.

The cell-specific carrier aggregation may have a form of carrier aggregation configured by any BS or cell. In case of an FDD system, a form of the cell-specific carrier aggregation may be a form in which a DL and UL linkage is determined according to a Tx-Rx separation specified in 3GPP LTE release-8/LTE-A. For example, a carrier frequency in the UL and the DL can be designated by an E-UTRA absolute radio frequency channel number (EARFCN) in the range 0 to 65535. The EARFCN and a carrier frequency in MHz unit for the DL may have a relation given by Equation 1 below.

$$F_{DL}=F_{DL\_low}+0.1(N_{DL}-N_{Offs-DL})$$ [Equation 2]

In Equation 2 above, $N_{DL}$ is a DL EARFCN, and $F_{DL}$ and $N_{DL\_low}$ and $N_{Off-DL}$ are given by Table 3 below.

TABLE 3

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 6001199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

An E-UTRA transmission channel (carrier centre frequency) to reception channel (carrier centre frequency) separation based on transmission and reception channel bandwidths can be defined by Table 4 below.

TABLE 4

| Frequency Band | TX-RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

For details related to the above description, the section 5.7 of 3GPP TS 36.101 V8.4.0 released in December 2008 can be incorporated by reference.

Now, a UE-specific carrier aggregation that can be used in a carrier aggregation system will be described. The UE-specific carrier aggregation is an operation of configuring a (component) carrier set that can be used by a specific UE or a specific UE group by using any method, for example, UE capability, signaling, etc., between a BS and a UE.

A UE-specific DL CC set can be defined as a set of DL CCs scheduled to receive a DL data channel (i.e., PDSCH) configured through dedicated signaling with respect to a specific UE. A UE-specific UL CC set can be defined as a set of UL CCs scheduled to transmit a UL data channel (i.e., PUSCH).

In the carrier aggregation system, a PDCCH monitoring DL CC set (hereinafter, simply referred to as a monitoring DL CC set) implies a set of DL CCs for monitoring a PDCCH, that is, a control channel for transmitting control information by a specific UE. The monitoring DL CC set may be a DL CC included in a UE-specific DL CC set, or may be a DL CC which includes a part of the UE-specific DL CC or which is not included in the UE-specific DL CC set. The PDCCH monitoring DL CC set can be configured in a UE-specific or cell-specific manner.

Cross-carrier scheduling is a scheduling method capable of performing resource allocation of a PDSCH transmitted by using a different carrier through a PDCCH transmitted through a specific CC and/or resource allocation of a PUSCH transmitted through another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

A system supporting cross-carrier scheduling may include the CIF in the existing DCI format. The system supporting cross-carrier scheduling may be an LTE-A system in which the CIF is added to the existing format (i.e., a DCI format used in LTE), and thus one to three bits can be extended, and a PDCCH structure can reuse the existing coding scheme, resource allocation scheme (i.e., CCE-based resource mapping), etc.

The system supporting cross-carrier scheduling can also support non cross-carrier scheduling. The non cross-carrier scheduling is a scheduling scheme in which resource allocation of a PDSCH of the same CC is performed by using a PDCCH transmitted through a specific CC, and resource allocation of a PUSCH transmitted through one CC linked to the specific CC is performed. The CIF may not be included in case of the non cross-carrier scheduling.

A BS can semi-statically configure whether the cross-carrier scheduling is activated. That is, the BS can semi-statically configure whether the CIF is included in the DCI format, and can configure it in a UE (or UE group) specific or cell specific manner. According to the semi-static configuration, a signaling overhead between the BS and the UE can decrease.

The following description is about a control information configuration method capable of decreasing the number of PDCCH blind decoding attempts of a UE in a carrier aggregation system, a control information reception method, and the UE.

In a carrier aggregation system, e.g., an LTE-A system, a UE not supporting carrier aggregation (hereinafter, an LTE UE) and a UE capable of supporting carrier aggregation (hereinafter, an LTE-A UE) may coexist. The carrier aggregation system can support not only the LTE UE but also a case where the LTE-A UE operates without using carrier aggregation. A control information configuration method (e.g., a DCI format configuration method) capable of decreasing the number of PDCCH blind decoding attempts performed by a UE (i.e., an LTE UE or an LTE-A UE) will be described in a situation where the carrier aggregation system does not consider carrier aggregation. In the carrier aggregation system (e.g., an LTE-A system), a new transmission mode can be defined, and the number of DCI formats available for each transmission mode can increase. Therefore, there is a need to decrease the number of PDCCH blind decoding attempts (hereinafter, simply referred to as the number of blind decoding attempts) that must be performed by a UE by limiting the number of possible cases of factors having an effect on the number of PDCCH blind decoding attempts of the UE in a situation where carrier aggregation is not considered.

I. The following three cases are factors having an effect on the number of blind decoding attempts of a UE when carrier aggregation is not supported.

the number of CCE aggregation level, 2) the number of CCE positions, 3) the number of DCI formats The first method, that is, 1) the method of limiting the number of CCE aggregation levels, may have an effect on a successful decoding probability of a PDCCH. As a result, the carrier aggregation system may be limited in its cell coverage.

The second method, that is, 2) the method of limiting the number of CCE positions, may increase a PDCCH blocking probability, which may result in limitation in the number of UEs that can be simultaneously supported by the carrier aggregation system.

The third method, that is, 3) the method of limiting the number of DCI formats, is a more effective method than the methods 1) and 2) in a sense that it can decrease the number of blind decoding attempts of the UE without increasing a PDCCH decoding failure probability and a PDCCH blocking probability.

For the method 3), it is possible to consider a method in which the number of newly added DCI formats is minimized, or if a new DCI format is added, a size of an information field is made equal to a size of an information field having an existing DCI format or a pre-added DCI format, and an indicator (i.e., an indication bit) capable of identifying a plurality of DCI formats having the same information field size is added to the information field.

Figure 13:
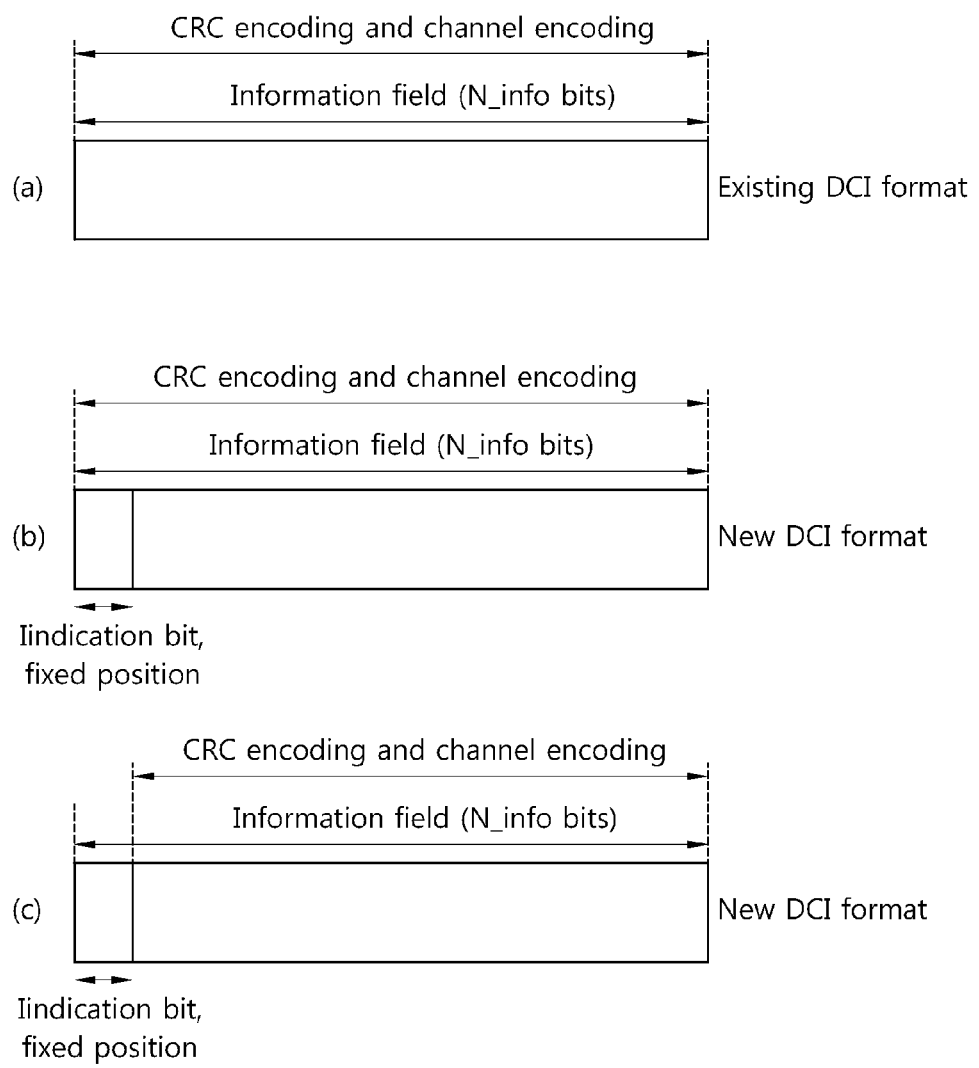
FIG. 13 shows an example of a new downlink control information (DCI) format.

FIG. 13 shows an example of a new DCI format.

Assume that the existing DCI of which an information field has N_info bits are present as shown in FIG. 13(a). In this case, a new DCI format of FIGS. 13(a) and (b) has the same information field size (i.e., N_info bits) as the existing DCI format, and an indicator (i.e., an indication bit) for identifying DCI formats having the same-sized information field can be included in a fixed position. The indicator can be subjected to CRC encoding and channel encoding by being included in the information field of the new DCI format as shown in FIG. 13(b). Alternatively, only a part excluding the indicator from the information field as shown in FIG. 13(b) can be subjected to CRC encoding and channel encoding, and the indicator can be separately encoded. In this case, a UE can know a specific format of the information field by decoding only the indicator before channel decoding and CRC detachment when the decoding is performed.

The new DCI format can be configured to have an information field equally applicable to a UL and a DL. In this case, the number of added new DCI formats can decrease. The DCI format applicable to both the UL and the DL must be indicated to know that for which link it is used between the UL and the DL. If a field for such an indication is called a UL/DL indicator, the UL/DL indicator can be transmitted in a predetermined fixed position in a DCI format. The UE can perform PDCCH blind decoding in a unit of unified size and thereafter can identify which DCI format is used by using the UL/DL indicator.

Next, there is a method for reporting to a UE about information indicating the number of PDCCHs to be obtained when the UE actually performs blind decoding by including the information into some PDCCHs or all corresponding PDCCHs. This method can decrease the average number of blind decoding attempts of the UE even if it cannot decrease the maximum blind decoding attempts of the UE. Without having to attempt the blind decoding by up to the maximum number of blind decoding attempts, the UE can stop the blind decoding in the middle of decoding when the number of PDCCHs to be obtained is satisfied.

II. A new DCI format configuration method for decreasing the number of blind decoding attempts of a UE in a situation of considering carrier aggregation.

A carrier aggregation system uses cross-carrier scheduling in general. The number of blind decoding attempts of the UE in a situation where cross-carrier scheduling based on carrier aggregation is considered is determined by other factors in addition to the aforementioned three factors in a situation where carrier aggregation is not considered.

1) A size of a monitoring DL CC set (i.e., the number of DL CCs as a monitoring target included in a monitoring DL CC set)

If it is assumed that a UE performs blind decoding for each DL CC in the monitoring DL CC set, the total number of blind decoding attempts of the UE is determined by the number of DL CCs for which blind decoding is performed. Therefore, the size of the monitoring DL CC set is an additional factor of determining the number of blind decoding attempts.

2) Whether to apply cross-carrier scheduling.

The total number of blind decoding attempts of a UE is influenced according to whether cross-carrier scheduling is applied. Cross-carrier scheduling may not be performed on some DL CCs included in a monitoring DL CC set in the same manner as LTE Rel-8. In this case, the UE can receive a PDSCH through a DL CC for receiving a PDCCH. Regarding some DL CCs for which cross-carrier scheduling is not activated, the UE can perform blind decoding 44 times in the DL CCs.

On the other hand, in case of DL CCs of which cross-carrier scheduling is activated in a monitoring DL CC set, the UE must perform blind decoding according to a new DCI format considering a carrier indication field (CIF). In this case, even for a DL CC of which cross-carrier scheduling is activated, there may be a PDSCH transmitted through the same DL CC as the DL CC for transmitting a PDCCH similarly to non-cross carrier scheduling. In the DL CC of which cross-carrier scheduling is activated, it is necessary to be able to transmit a newly defined DCI format and a PDSCH based on the newly defined DCI format by considering a CIF without having to perform blind decoding based on LTE Rel-8. That is, blind decoding must be performed even for non-cross carrier scheduling by assuming transmission and reception of a PDCCH (more specifically, a DCI format) considering a CIF. Otherwise, the UE has a burden of searching not only DCI formats including a CIF with respect to a corresponding DL CC but also DCI format not including a CIF for the existing LTE Rel-8. Therefore, blind decoding can be performed on the DCI format considering the CIF irrespective of whether the UE applies cross-carrier scheduling in the carrier aggregation system. In this case, a DL CC index can be included in the CIF in order to utilize a newly defined DCI format in a non-cross carrier scheduling situation.

3) Whether a common search space is included in each DL CC in a monitoring DL CC set.

A presence/absence of a common search space is another factor having an effect on the number of blind decoding attempts of a UE. In LTE Rel-8, the common search space may exist in a search space of the UE. The total number of blind decoding attempts of the UE can be influenced according to whether the common search space is included in all DL CCs in a monitoring DL CC set in a carrier aggregation system.

Table 5 to Table 10 below show examples of a DCI format that must be transmitted only through the common search space.

TABLE 5

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

TABLE 6

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

TABLE 7

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

TABLE 8

| DCI format | Search Space |
|---|---|
| DCI format 0 | Common |

TABLE 9

| DCI format | Search Space |
|---|---|
| DCI format 3/3A | Common |

TABLE 10

| DCI format | Search Space |
|---|---|
| DCI format 3/3A | Common |

Table 5 above relates to a PDCCH and a PDSCH which are configured by an SI-RNTI. Table 6 above relates to a PDCCH and a PDSCH which are configured by a P-RNTI. Table 7 above relates to a PDCCH and a PDSCH which are configured by an RA-RATI. Table 8 relates to a PDCCH configured by a temporary C-RNTI. Table 9 relates to a PDCCH configured by a TPC-PUCCH-RNTI. Table 10 relates to a PDCCH configured by a TPC-PUSCH-RNTI.

The DCI formats included in Table 5 to Table 10 above can be transmitted in a common search space of a carrier aggregation system according to respective methods described below.

[A Method of Configuring a Common Search Space in a Carrier Aggregation System]

Since an LTE-A UE must perform blind decoding on PDCCHs of all DL CCs included in a monitoring DL CC set, there is no problem in an operation of the LTE-A UE if the common search space is included only in one DL CC in the monitoring DL CC set. Therefore, a PDCCH corresponding to the common search space can be transmitted only for some DL CCs in the monitoring DL CC set, and a DL CC including the common search space can be reported as embedded information to the UE when reporting the monitoring DL CC set to the UE.

When the common search space is included in only one DL CC in a UE-specific monitoring DL CC set, a BS preferably configures the common search space in a common DL CC among DL CCs of a monitoring DL CC set configured for each UE. For example, when a DL CC#1 and a DL CC#2 are included in a monitoring DL CC set of a UE #1 and a DL CC#2 and a DL CC#3 are included in a monitoring DL CC set of a UE #2, the BS preferably includes the common search space for the UE #1 and the UE #2 in the DL CC#2. When the common DL CC does not exist or for other reasons, the BS may configure a plurality of DL CCs having the common search space.

The common search space can be configured only in some DL CCs in the monitoring DL CC set, and only a UE-specific search space can be configured in the remaining DL CCs. For example, if it is assumed that a DL CC#1, a DL CC#2, and a DL CC#2 are DL CCs in the monitoring DL CC set, the DL CC#1 can include only a common search space (a UE-specific search space can also be included), and the DL CC#2 and the DL CC#2 can include only a UE-specific search space (the present invention is not limited to this example, and thus it is also possible to configure such that only the common search space exists in a specific component carrier. A component carrier in which only a common search space exists can be configured in a UE specific or cell specific manner). In this case, control information can be configured according to the following method.

An example of information transmitted through a common search space in a DL includes power control information (e.g., DCI format 3/3A). If power control must be performed individually for each UL CC, a field such as a CIF indicating a corresponding UL CC needs to be included in a DCI format for the power control when transmitting the information. In this case, a new DCI format (e.g., a new DCI format 3/3A) can be configured such that a plurality of fields for indicating a UL CC are included by the number of activated UL CCs. According to this method, power control for a plurality of UL CCs can be performed through transmission of one new DCI format 3/3A.

Another example of the information transmitted through the common search space includes formats 1A and 1C. The DCI formats 1A and 1C are DCI formats which are CRC masked by using SI-RNTI, P-RNTI, and RA-RNTI. All of the DCI formats are for transmitting system information/RACH information/paging information when performing initial network access or paging. In order to indicate one or more DL CCs similarly to the DCI formats 3/3A, a new DCI format can be configured by including one or more fields indicating the DL CC. The new DCI format can be transmitted through the common search space.

If it is assumed that the common search space is configured only in a specific DL CC and corresponding PDCCHs are transmitted, extension of the common search space for an LTE-A UE can be taken into consideration. For example, if the number of CCEs configured in the common search space in the existing LTE Rel-8 is N, the common search space can be determined by (2×N) or (the number of DL CCs in the monitoring DL CC set×N). In this case, for backward compatibility, the extended CCE can be configured to include the common search space configured in the existing LTE Rel-8.

Another method of configuring the common search space can transmit a PDCCH (DCI format) transmitted in the common search space through all DL CCs without performing cross-carrier scheduling. For example, power control information such as the DCI formats 3/3A can be transmitted not only through a common search space of a specific DL CC included in a monitoring DL CC set but also through all DL CCs included in a monitoring DL CC set. Since a different UL transmit power can be required for each UL CC, power control information such as the DCI formats 3/3A may be transmitted separately for each DL CC, and cross carrier scheduling may not be performed.

As a factor having an effect on the number of blind decoding attempts of the UE in carrier aggregation, the following three factors can be further considered in addition to the aforementioned factors, i.e., 1) the size of the monitoring DL CC set, 2) whether to apply cross-carrier scheduling, and 3) whether the common search space is included in each DL CC in the monitoring DL CC set.

1. A transmission mode for each component carrier
2. A system bandwidth of each component carrier (i.e., the number of resource blocks in a DL and a UL for each component carrier)
3. The number of antenna ports for each component carrier A reason that these three components have an effect on the number of blind decoding attempts of the UE will be first described, and then a control information configuration method according to the present invention will be described.

In the existing LTE Rel-8, transmission modes are mapped to DCI formats in a 1:1 or 1:N manner (where N is a natural number greater than or equal to 2). The UE can know the transmission mode, a system bandwidth, and the number of antenna ports by receiving system information from a BS, and thus can decrease combinations of DCI formats to be searched when the UE performs blind decoding.

However, the carrier aggregation system does not guarantee that the UE can know the transmission mode with respect to all component carriers that can be scheduled. Therefore, if the UE performs blind decoding based on LTE Rel-8, the UE which does not know a transmission mode of any component carrier must perform blind decoding for all DCI formats to be mapped to all possible transmission modes. When transmission modes (7 modes in total) of a corresponding component carrier is unknown according to LTE Rel-8, up to 7×44 blind decoding attempts must be performed.

The system bandwidth has a direct effect on an information field size with regards to resource allocation. Therefore, if the UE does not know the system bandwidth, PDCCH decoding itself may be impossible since there are too many cases of system bandwidths.

In case of the number of antenna ports, an information field changes depending on the number of antenna ports in the existing DCI formats 1B, 1D, 2, etc., and the number of bits of transmitted precoding matrix indicator (TPMI) changes as shown in Table 11 below. Therefore, if the number of antenna ports of a corresponding component carrier is unknown, blind decoding may have to be performed two times when finding a corresponding DCI format.

TABLE 11

| Number of antenna ports at eNode-B | Number of bits for TPMI information |
| --- | --- |
| 2 | 2 |
| 4 | 4 |

In Table 11 above, the number of antenna ports of a BS is 2 or 4, a TPMI field included in the DCI formats 1B and 1D is 2 bits and 4 bits in that order.

TABLE 12

| Number of antenna ports at eNode-B | Number of bits for precoding information |
|---|---|
| 2 | 3 |
| 4 | 6 |

If the number of antenna ports of the BS is 2 or 4 in Table 12 above, the number of bits of precoding information included in the DCI format 2 is 3 and 6 in that order.

That is, the system band of each component carrier and the number of antenna ports are factors of changing a size of an information field with respect to one DCI format when configuring a DCI format of LTE Rel-8.

There is no problem if all of corresponding DL CCs included in a monitoring DL CC set have the same transmission mode, the same system band, and the same number of antenna ports. However, since such a restriction is against an intrinsic reason or motivation of existence of cross-carrier scheduling and carrier aggregation, there is a need for a control information configuration method capable of decreasing the number of blind decoding attempts of the UE while maintaining scheduling flexibility.

A BS can transmit some or all of three types of information by embedding them when transmitting information for configuring a monitoring DL CC set. The three types of information include: 1. a transmission mode for each component carrier; 2. a system bandwidth of each component carrier (i.e., the number of resources blocks in a DL and a UL for each component carrier); and 3. the number of antenna ports for each component carrier. The BS can transmit these information pieces by using an RRC message or a physical layer signal. A system bandwidth for a DL CC included in a monitoring DL CC set does not change during a system operation, and thus can be configured statically by using the RRC message. The remaining information pieces 2 and 3 can be changed semi-statically or dynamically.

Figure 14:
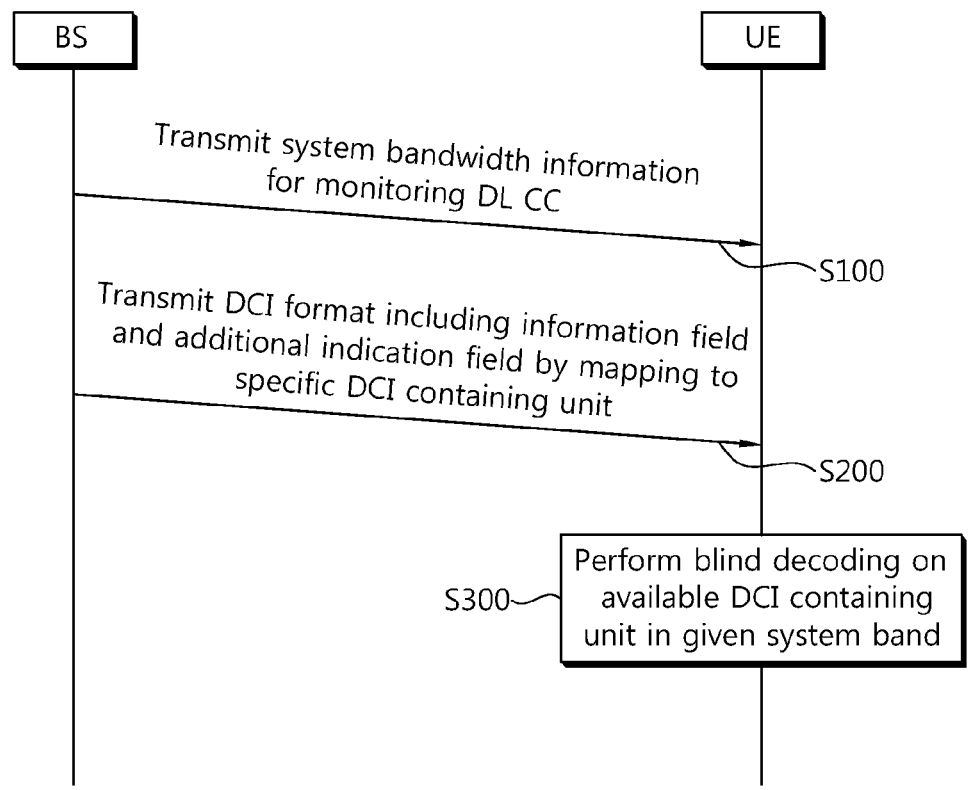
FIG. 14 shows a signaling process between a BS and a UE according to an embodiment of the present invention.

FIG. 14 shows a signaling process between a BS and a UE according to an embodiment of the present invention.

Referring to FIG. 14, the BS transmits system bandwidth information for a monitoring DL CC to the UE (step S100). The system bandwidth information for the monitoring DL CC can be configured statically by using the RRC message, and can be transmitted by being included in configuration information for the monitoring DL CC set.

The BS configures a DCI format including an information field and an additional indication field to the UE, and transmits the DCI format by mapping it to a specific DCI containing unit (also referred to as a DCI container) (step S200). The UE performs blind decoding on the DCI containing unit which is possible in a given system bandwidth (step S300). A second operation of S200 and S300 will be described below in detail.

Figure 15:
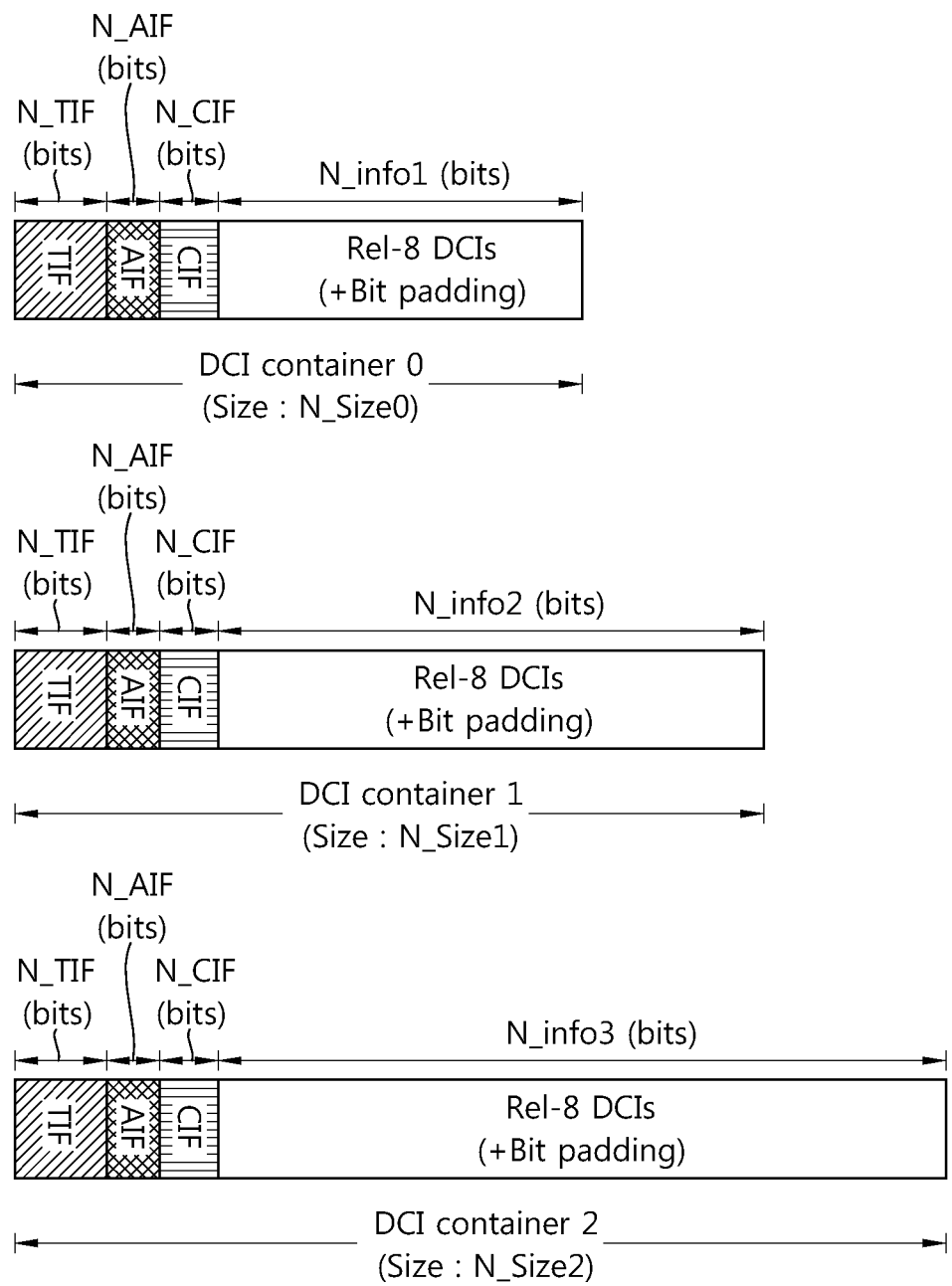
FIG. 15 shows an example of a DCI container (i.e., a DCI containing unit) to which a DCI format can be mapped.

FIG. 15 shows an example of a DCI container (i.e., a DCI containing unit) to which a DCI format can be mapped.

Referring to FIG. 15, a predetermined number of DCI containers can be defined between a BS and a UE with respect to a given system bandwidth. An example of defining 3 types of DCI containers is shown in FIG. 15. An information field and an additional indication field can be mapped to each DCI container. The information field includes any one of a plurality of DCI formats applicable to corresponding component carriers. The additional indication field includes information capable of identifying a specific DCI format to which the information field corresponds among the plurality of DCI formats.

For example, the information field can include any one of DCI formats of the aforementioned existing LTE Rel-8, and can include a padding bit. When the existing LTE Rel-8 DCI format has a smaller bit size than the information field of the DCI container, it can be adjusted to a bit size of a DCI container information field by performing padding by the use of bits having a specific value (e.g., 0).

For example, the additional indication field can include at least one of a transmission mode indication field (TIF) and an antenna port indication field (AIF), and can include one carrier indication field (CIF). The TIF indicates a transmission mode for a CC indicated by the CIF. The AIF indicates an antenna port for a CC indicated by the CIF. The respective additional indication fields can be located in a fixed position in the DCI containers. In addition, the additional indication fields can be mapped to the same position and can have the same size even if the DCI containers have different sizes. By using the additional indication field, the UE can know a transmission mode, an antenna port, an applied component carrier, etc., to which information included in the information field of the DCI container is applied.

Although a case where the existing DCI format is included in the information field of the DCI container is described in the above example, it is apparent that a new DCI format different from the existing DCI format can also be included.

Further, the additional indication field of the DCI container may be transmitted by being encoded separately from the information field. In this case, the additional indication field can have the same bit size irrespective of the total size of each DCI container.

Furthermore, the additional indication field may include a field capable of identifying a UL/DL (for convenience, it is referred to as a DUIF) in addition to the aforementioned TIF, AIF, and CIF.

Although a case where all of the TIF, the AIF, and the CIF are included in the additional indication field is described for example in FIG. 15, the present invention is not limited thereto. For example, when any UE performs initial network entry through a specific CC, if the BS reports a system bandwidth, transmission mode, and the number of antenna ports of all DL CCs/UL CCs (or some DL CCs/UL CCs such as activated CCs or UE-specific CCs), in which the UE can be cross-carrier scheduled through the specific CC by using RRC signaling or a broadcast channel (BCH), the additional indication field may include only the CIF. If the BS reports the system band, the transmission mode, and the number of antenna ports to the UE through the BCH, they must be reported for all CCs configured in a cell-specific manner, and if they are reported through the RRC signals, it is enough to report them only to CCs configured in a UE-specific manner. In a DL CC (e.g., an extended component carrier) in which no control channel is transmitted, the UE can normally perform PDCCH blind decoding only when a system bandwidth, the number of antenna ports, a transmission mode, or the like of a corresponding DL CC is reported by using RRC signaling.

One or more DCI formats can be mapped to a DCI container predetermined according to a system bandwidth of a given component carrier.

For example, if it is assumed that a system bandwidth is 50 RB for a specific component carrier, and also four antenna ports are included, a size of the existing DCI format is as shown in Table 13 below when a CRC is included.

TABLE 13

| DCI format | Purpose | Number of bits |
|---|---|---|
| 0 | PUSCH grant | 42 |
| 1 | PDSCH assignment with a single codeword | 47 |
| 1A | PDSCH assignment using a compact format | 42 |
| 1B | PDSCH assignment for rank-1 transmission | 46 |
| 1C | PDSCH assignment using a very compact format | 26 |
| 1D | PDSCH assignment for MU-MIMO | 46 |
| 2 | PDSCH assignment for closed-loop MIMO operation | 62 |
| 2A | PDSCH assignment for open-loop MIMO operation | 58 |
| 3 | TPC commands with 2 bit power adjustment | 42 |
| 3A | TPC comments with 1 bit power adjustment | 42 |

In this case, if it is assumed a case where three DCI containers are defined as shown in FIG. 15, in Table 13 above, the existing DCI formats 0, 1A, 3, 3A, 1B, and 1D can be combined and then mapped to an information field of a DCI container 1, the DCI format 1C can be mapped to an information field of a DCI container 0, and the DCI formats 2 and 2A can be mapped to an information field of the DCI contained 2. In addition, an additional indication field can be mapped to a bit of which a position and a size are predetermined in each DCI container. The above example is only for one embodiment, and thus the DCI container can be configured in various manners by combining DCI formats having the same size so that an available padding bit can decrease.

According to such a control information configuration method, it is enough for the UE to perform blind decoding only for a predetermined number of DCI containers even in a case where a transmission mode and the number of antenna ports of each component carrier are unknown in a carrier aggregation system (herein, it is assumed that a system bandwidth of the component carrier is known through system information). In addition, since a specific transmission mode and a specific number of antenna ports for the information field included in each DCI container can be known through the additional indication field, the number of blind decoding attempts can decrease.

Figure 16:
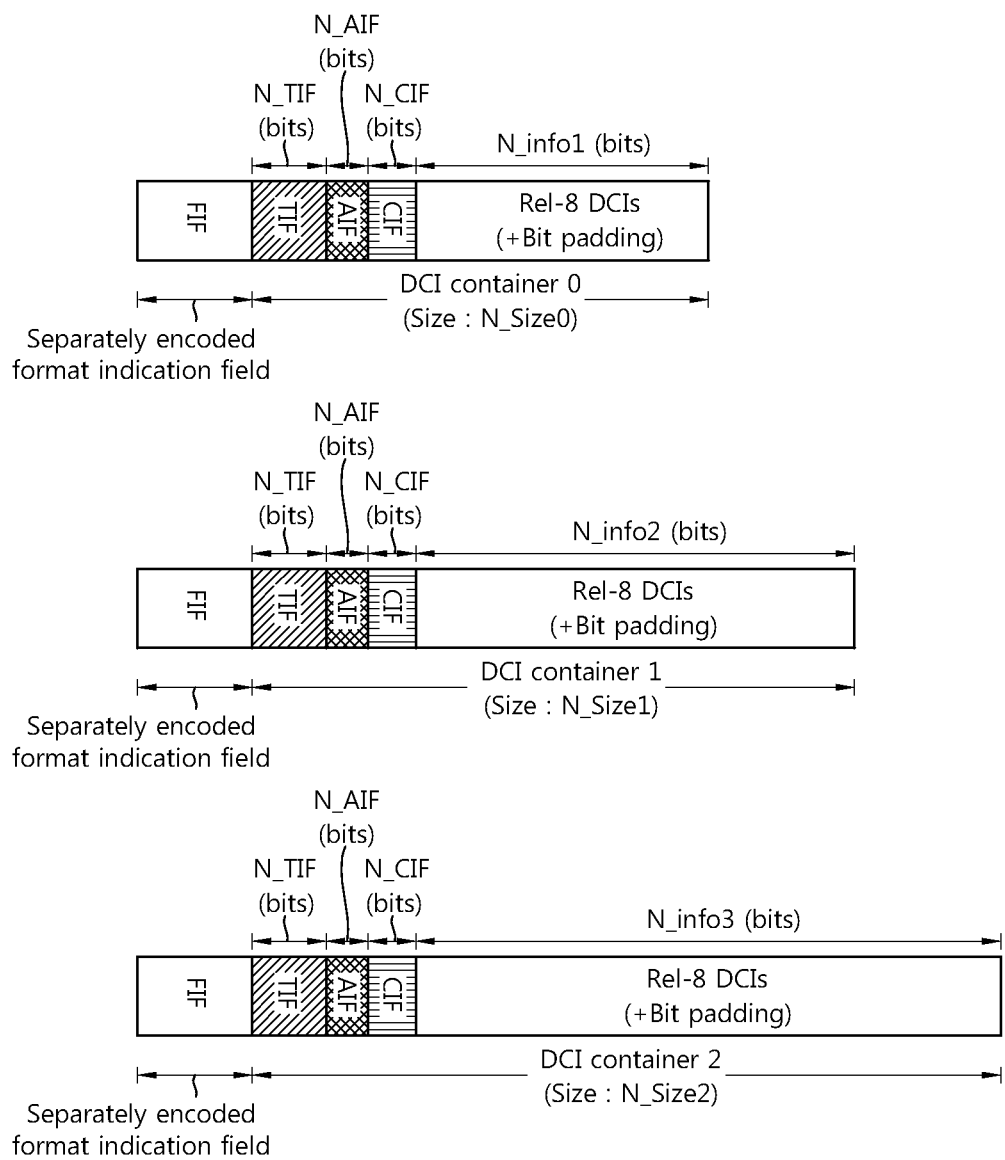
FIG. 16 shows an example of a DCI container according to another embodiment of the present invention.

FIG. 16 shows an example of a DCI container according to another embodiment of the present invention.

Referring to FIG. 16, the DCI container further includes a format indication field (FIF) in the DCI container described in FIG. 15.

The FIF is a field indicating a DCI format or a group of the DCI format included in the DCI container. That is, the DCI format included in each DCI container can be identified by using the FIF.

For example, in Table 13 above, if the existing DCI formats 0, 1A, 3, 3A, 1B, and 1D are combined and then mapped to a DCI container 1, the DCI format 1C is mapped to a DCI container 0, and the DCI formats 2 and 2A are mapped to a DCI container 2, then the FIF can include information indicating a DCI group or a DCI format mapped to each DCI container.

The FIF may have a predetermined fixed position. For example, the FIF can be located before or after the DCI container described in FIG. 15. Further, the FIF can be added after being separately encoded independently from the DCI container described in FIG. 15.

Hereinafter, a detailed example of a DCI container configuration and an algorithm of selecting a DCI container size will be described.

When a carrier aggregation system considers carrier aggregation and does not consider cross-carrier scheduling, if any method for decreasing the number of blind decoding attempts of a UE is not used, the number of blind decoding attempts of the UE can be calculated under the following assumptions. 1. An active CC set includes N activated component carriers. 2. The number of component carriers is equally N for both a DL and a UL. 3. One monitoring DL CC exists in an active CC set.

Under the such assumptions, since PDSCH/PUSCH scheduling can be performed on (N−1) component carriers other than one monitoring DL CC through PDCCHs each having a different payload size, the UE must perform up to (44×N) blind decoding attempts on one given monitoring DL CC. If M (M≤N) monitoring DL CCs exist in an active CC set including N activated component carriers, the UE has a burden of performing M×N×44 blind decoding attempts in total.

Therefore, it can be considered a method of grouping DCI formats having a similar bit size by designing a DCI container consisting of an additional indication field and an information field. As described above, a DCI format can be mapped to the information field, and information for reporting a specific component carrier, system band, transmission mode, antenna port, etc., to which information included in the information field is applied can be mapped to the additional indication field at a predetermined location.

Targets of DCI formats to be grouped may be all or some of DCI formats of LTE Rel-8. Table 14 below shows an example of a bit size (including a 16-bit CRC) of DCI formats of LTE Rel-8.

TABLE 14

| DCI Format | | Bandwidth (RBs) | | | | |
|---|---|---|---|---|---|---|
| | | 6 | 15 | 25 | 50 | 75 | 100 |
| Format 0 | | 37 | 38 | 41 | 43 | 43 | 44 |
| Format 1 | | 35 | 39 | 43 | 47 | 49 | 55 |
| Format 1A | | 37 | 38 | 41 | 43 | 43 | 44 |
| Format 1B | 2Tx | 38 | 41 | 43 | 44 | 45 | 46 |
| | 4Tx | 41 | 43 | 44 | 46 | 47 | 49 |
| Format 1C | | 24 | 26 | 28 | 29 | 30 | 31 |
| Format 1D | 2Tx | 38 | 41 | 43 | 44 | 45 | 46 |
| | 4Tx | 41 | 43 | 44 | 46 | 47 | 49 |
| Format 2 | 2Tx | 47 | 50 | 55 | 59 | 61 | 67 |
| | 4Tx | 50 | 53 | 58 | 62 | 64 | 70 |
| Format 2A | 2Tx | 44 | 47 | 52 | 57 | 58 | 64 |
| | 4Tx | 46 | 49 | 54 | 58 | 61 | 66 |
| Format 3/3A | | 37 | 38 | 41 | 43 | 43 | 44 |

In general, the number of blind decoding attempts of the UE and the number of DCI containers, and the number of DCI formats as a target of grouping and a padding bit are related as follows.

First, as the number of DCI containers increases, the maximum number of blind decoding attempts linearly increases with respect to a total sum of a given CCE aggregation level and the number of search spaces. On the contrary, as the number of DCI containers increases, a unit (or granularity) capable of including given DCI format sizes increases, and thus the number of padding bits may decrease.

When the number of DCI formats as a target of grouping decreases, there is a high probability that a variation of a DCI format size decreases to that extent, and there is an effect of decreasing the number of padding bits for the given DCI container size. On the contrary, if the number of DCI formats as a target of grouping decreases, additional blind decoding must be performed on excluded DCI formats, and thus the number of blind decoding attempts may increase.

By considering above aspects, a type of DCI formats to be grouped and the number of DCI containers are determined by properly considering the number of padding bits and the number of blind decoding attempts.

Figure 17:
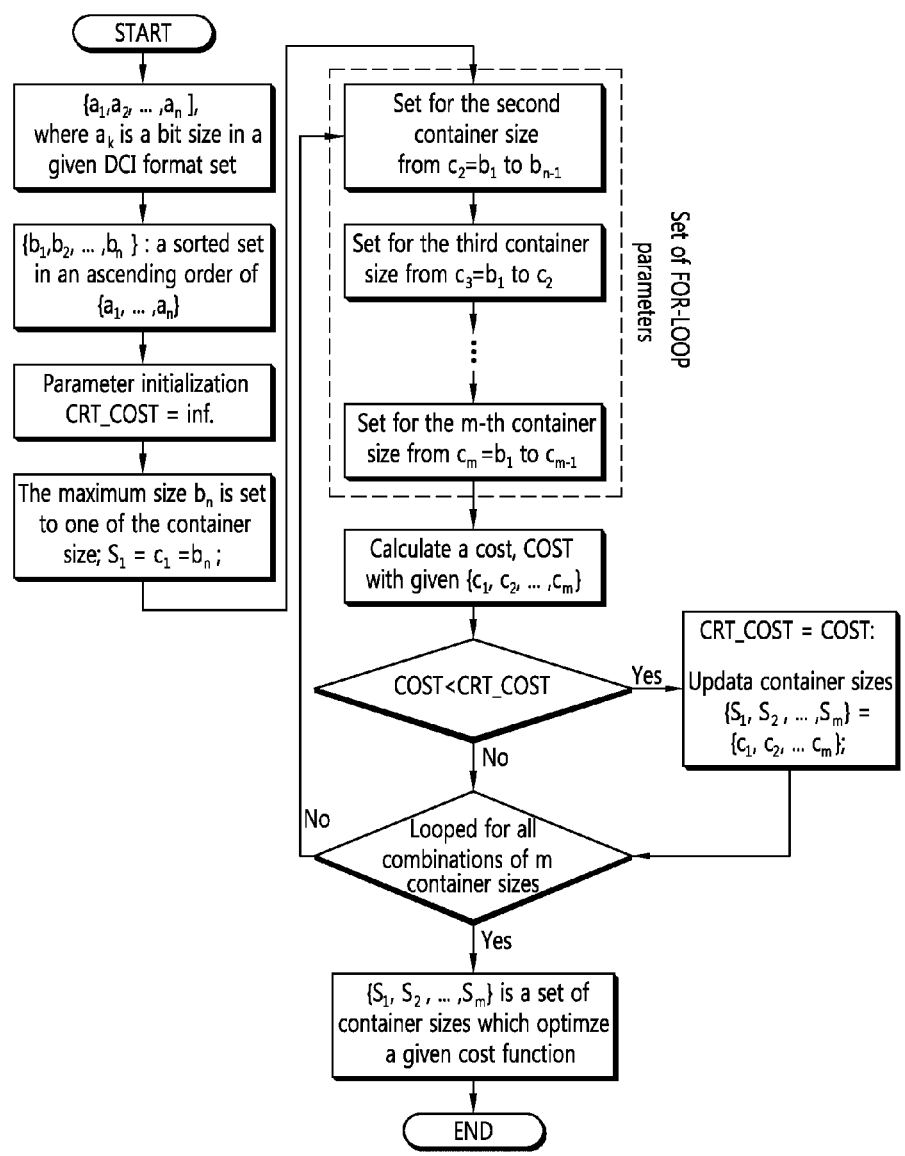
FIG. 17 shows a method of determining a bit size of a DCI container.

When assuming a DCI format set to be applied to a DCI container size through DCI format grouping and the number of any DCI containers, a method of determining a size of the DCI container can be determined according to a flowchart of FIG. 17.

FIG. 17 shows a method of determining a bit size of a DCI container.

Referring to FIG. 17, $a_1, \ldots, a_n$ are values for indicating a size of each DCI format into the number of bits. Any $a_i$ and $a_j$ may have the same size. $b_1, \ldots, b_n$ are results of sorting $a_1, \ldots, a_n$ in an ascending order. It is assumed that a bit size of a DCI container is any one of $a_1, \ldots, a_n$. This is because there is no need to set the bit size of the DCI container to a value other than one of $a_1, \ldots, a_n$ from the perspective of decreasing the padding bit.

By assuming the DCI container bit size to any one of values $b_1, \ldots, b_n$ and by repetitively calculating values based on a condition of a cost function described below, an optimal DCI container bit size value is found.

$c_1, \ldots, c_n$ are combinations selected from all possible sizes for calculating respective cots, and have an ascending order of $c_1 < c_2 < \ldots < c_n$.

Herein, the following factors are taken into account in the cost function for calculating a cost.

1. The total number of padding bits of all DCI formats is minimized (condition 1).
2. A total sum of average values of the number of padding bits of DCI formats included for each DCI container is minimized (condition 2).
3. A maximum value of the number of padding bits of each of DCI formats in a corresponding DCI container is minimized (condition 3).
4. A total sum of padding ratios obtained by normalizing padding bits of each DCI format into a size of a corresponding DCI container is minimized (condition 4).
5. A maximum value of padding ratios obtained by normalizing padding bits of each DCI format into a size of a corresponding DCI container is minimized (condition 5).
6. A value obtained by normalizing a sum of all padding bits for each DCI container into a size of a corresponding DCI container is minimized (condition 6).

A 1-bit indicator for distinguishing a UL and a DL can be added as a padding bit with respect to a DCI format 0 among DCI container bit sizes derived from the aforementioned 6 conditions. For this, a size of a corresponding DCI container may increase by one bit from an optimized value.

FIG. 18 to FIG. 23 show examples of an optimal DCI container size derived according to the method of FIG. 17 under the assumption that the number of DCI containers is 2.

Figure 18:
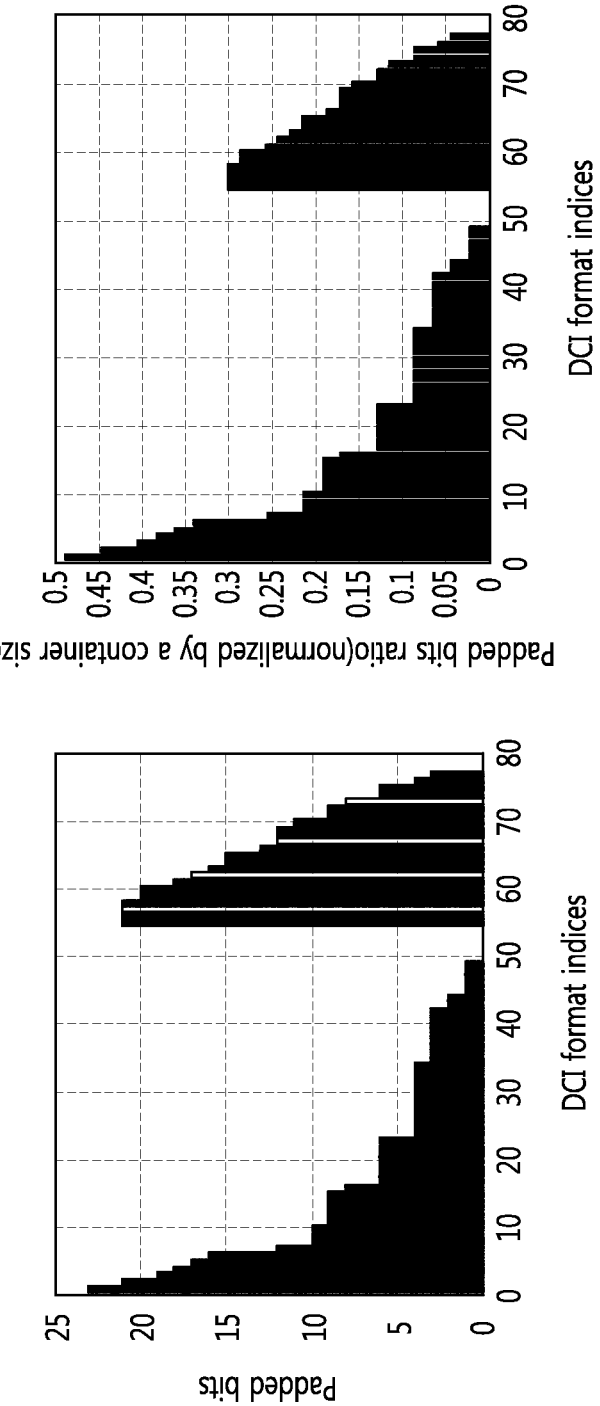
FIG. 18 to FIG. 23 show examples of an optimal DCI container size derived according to the method of FIG. 17 under the assumption that the number of DCI containers is 2.

Referring to FIG. 18, a size of DCI containers for minimizing the total number of padding bits of all DCI formats includes 47 bits and 70 bits.

Figure 19:
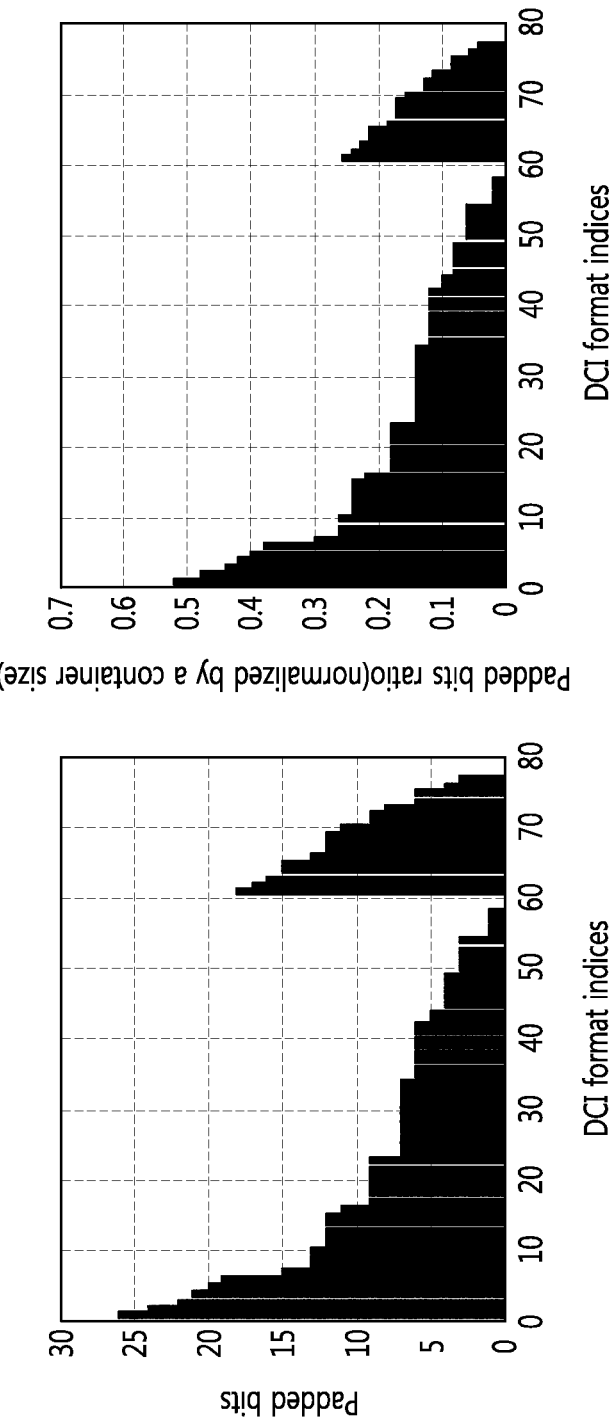

Referring to FIG. 19, a size of DCI containers for minimizing the total sum of average values of the number of padding bits of DCI formats included for each DCI container includes 50 bit and 70 bits.

Figure 20:
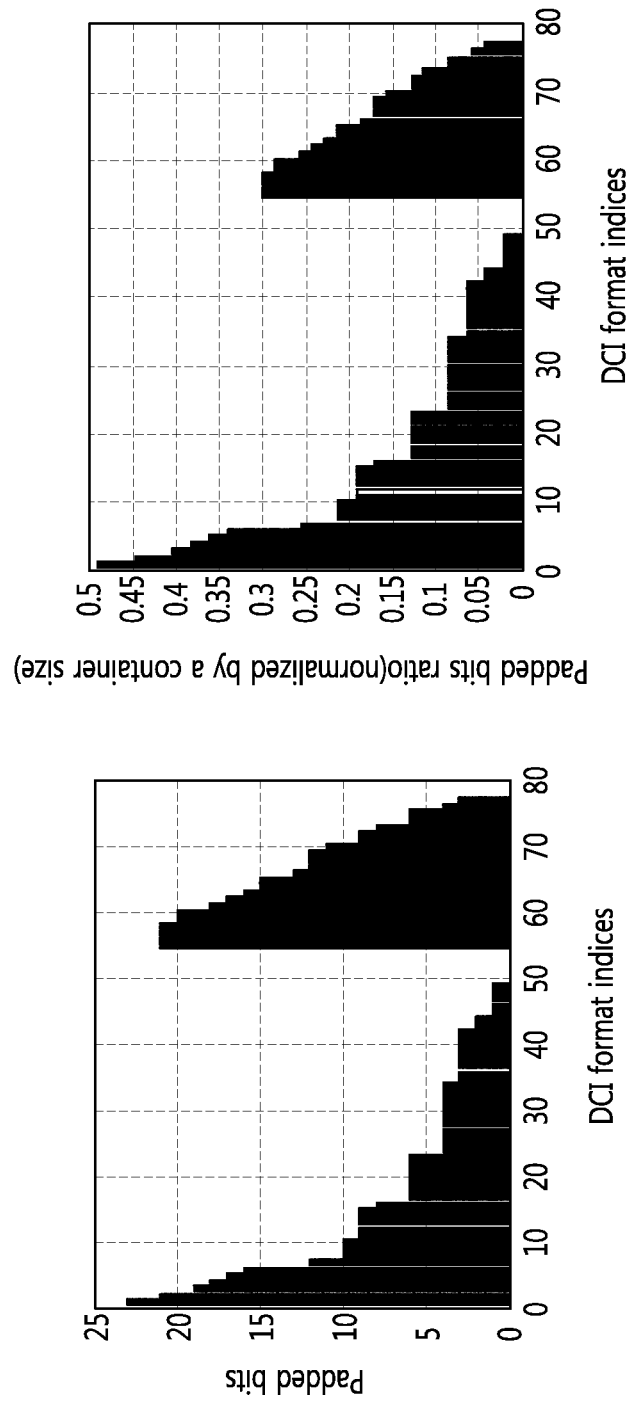

Referring to FIG. 20, a size of DCI containers for minimizing a maximum value of the number of padding bits of each DCI formats in a corresponding DCI container includes 47 bits and 70 bits.

Figure 21:
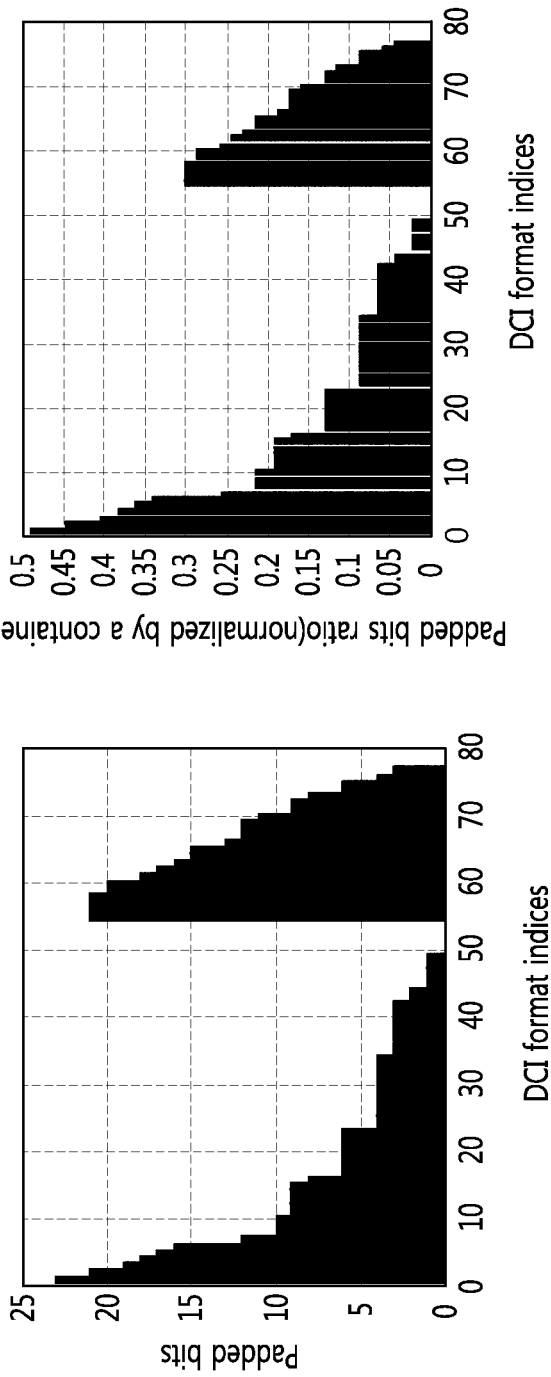

Referring to FIG. 21, a size of DCI containers for minimizing a total sum of padding ratios obtained by normalizing padding bits of each DCI format into a size of a corresponding DCI container includes 47 bits and 70 bits.

Figure 22:
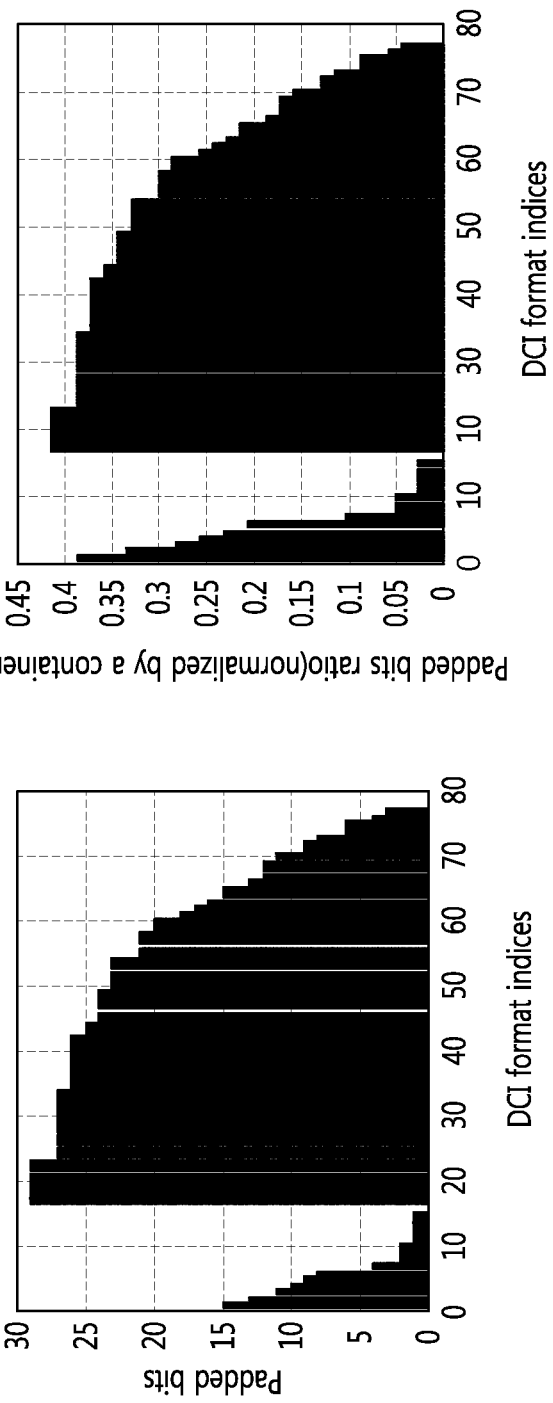

Referring to FIG. 22, a size of DCI containers for minimizing a maximum value of padding ratios obtained by normalizing padding bits of each DCI format into a size of a corresponding DCI container includes 39 bits and 70 bits.

Figure 23:
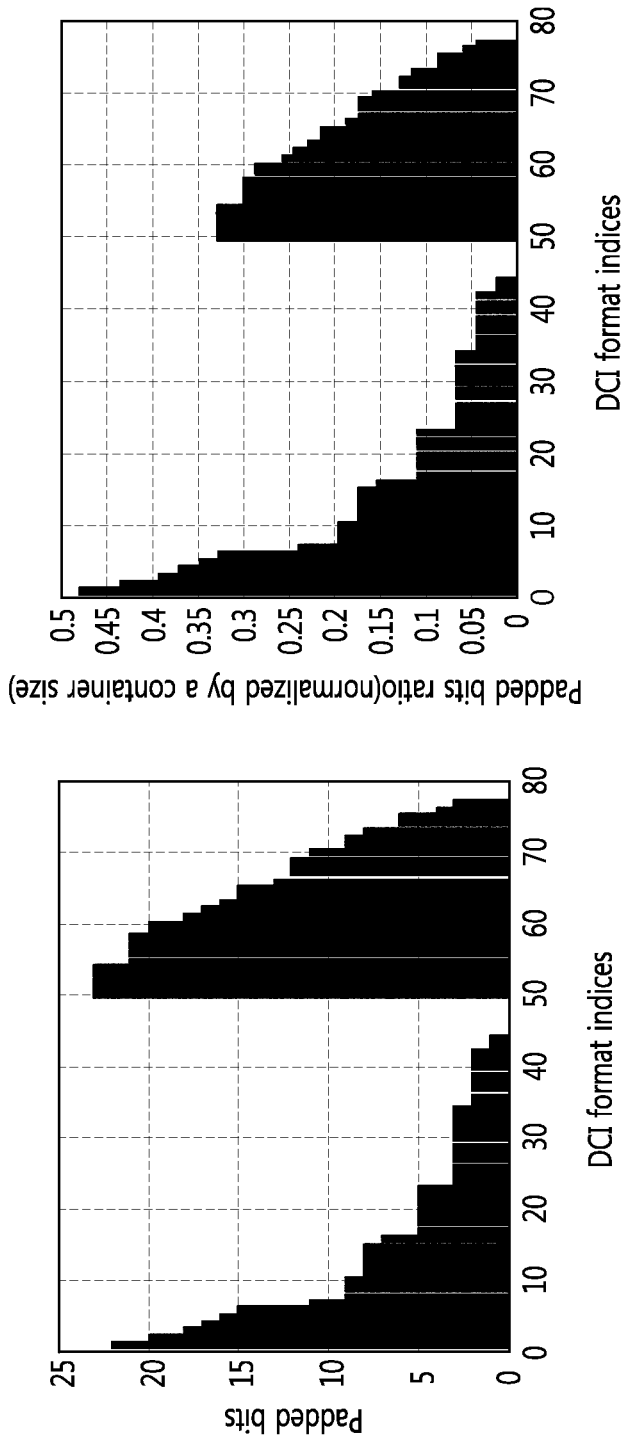

Referring to FIG. 23, a size of DCI containers for minimizing a sum of all padding bits for each DCI container into a size of a corresponding DCI container includes 46 bits and 70 bits.

Although a case where the number of DCI containers is 2 is assumed in the above description of FIG. 18 to FIG. 23, the present invention is not limited thereto, and thus an optimal DCI container bit size can be derived by using the algorithm of FIG. 17 and by assuming two or more DCI containers. For example, the optimal container bit size can be derived according to the aforementioned algorithm by assuming a case where the number of DCI containers is 3. In this case, the DCI container bit size can be derived such as [44, 50, 70] in case of the condition 1, [50, 67, 70] in case of the condition 2, [39, 55, 70] in case of the condition 3, [44, 50, 70] in case of the condition 4, [31, 49, 70] in case of the condition 5, and [41, 49, 70] in case of the condition 6.

Figure 24:
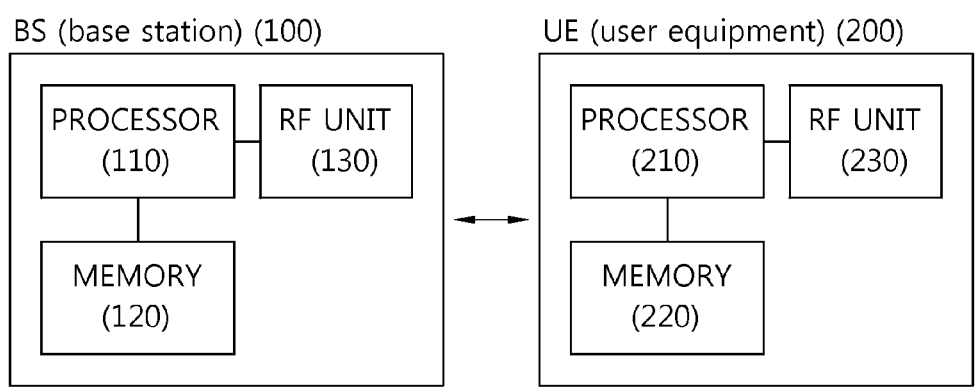
FIG. 24 is a block diagram showing a BS and a UE.

FIG. 24 is a block diagram showing a BS and a UE.

ABS 100 includes a processor 110, a memory 120, an a radio frequency (RF) unit 130. The processor 110 implements the proposed functions, procedures, and/or methods. For example, the processor 110 transmits bandwidth information of a component carrier, configures DL control information including an additional indication field and an information field, and maps the DL control information in any one of containing units having a plurality of predetermined bit sizes according to the bandwidth information. Further, the processor 110 may transmit the DL control information mapped to any one of the containing units to a UE. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives bandwidth information of a component carrier and receives DL control information by monitoring containing units having a plurality of predetermined different bit sizes according to the bandwidth information. In this case, the DL control information is mapped to any one of containing units having the plurality of predetermined bit sizes, and the UE performs blind decoding with respect to the containing unit. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memory 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of transmitting control information by a base station (BS) in a carrier aggregation system, the method comprising:
   transmitting, to a user equipment (UE), bandwidth information of a component carrier;
   generating downlink control information (DCI) using a DCI format among N different DCI formats which can be used in the component carrier, wherein the DCI comprises an additional indication field which informs the UE about the DCI format used to generate the DCI;
   mapping the DCI to a DCI container among M different DCI containers; and
   transmitting, to the UE, the DCI mapped to the DCI container so as to enable blind decoding of the DCI by the UE,
   wherein each of the M different DCI containers has a predetermined bit size in accordance with the bandwidth information,
   wherein at least 2 DCI formats among the N different DCI formats can be mapped to a same DCI container among the M different DCI containers,
   wherein, if a bit size of the DCI container is greater than a total bit size of the DCI, different bits remaining after mapping the DCI in the DCI container are padded to a bit having a specific value, and
   wherein N and M are natural numbers and M is smaller than N.

2. The method of claim 1, wherein the additional indication field further includes:
   a transmission mode indication field indicating a transmission mode for the component carrier or an antenna port indication field indicating an antenna port for the component carrier, and
   a carrier indication field indicating the component carrier.

3. The method of claim 2, wherein the additional indication field further includes an uplink-downlink indication field indicating for which link, between an uplink and a downlink, the information field is used as control information.

4. The method of claim 2, wherein the additional indication field further includes a format indication field capable of identifying the DCI container.

5. The method of claim 1, wherein the additional indication field is mapped to a predetermined fixed location in the DCI container.

6. The method of claim 1,
   wherein each of the M different DCI containers have a different predetermined bit size, and
   wherein the additional indication field is mapped for all of the M different DCI containers with the same position and the same bit size.

7. The method of claim 1,
   wherein, if the component carrier comprises a plurality of component carriers, a common search space is configured only in some of the plurality of component carriers, and downlink control information for a plurality of user equipments is transmitted in the common search space, and
   wherein the some of the plurality of component carriers are component carriers commonly assigned to the plurality of user equipments.

8. A method of receiving control information of a user equipment in a carrier aggregation system, the method comprising:
   receiving bandwidth information of a component carrier;
   receiving downlink control information (DCI) by monitoring M different DCI containers; and
   blind decoding the received DCI,
   wherein the DCI is generated using a DCI format among N different DCI formats which can be used in the component carrier, and the DCI comprises an additional indication field which informs the UE about the DCI format used to generate the DCI,
   wherein the DCI is mapped to a DCI container among the M different DCI containers,
   wherein each of the M different DCI containers has a predetermined bit size in accordance with the bandwidth information,
   wherein at least 2 DCI formats among the N different DCI formats can be mapped to a same DCI container among the M different DCI containers,
   wherein, if a bit size of the DCI container is greater than a total bit size of the DCI, different bits remaining after mapping the DCI in the DCI container are padded to a bit having a specific value, and
   wherein N and M are natural numbers and M is smaller than N.

9. The method of claim 8, wherein the additional indication field further includes:
   a transmission mode indication field indicating a transmission mode for the component carrier or an antenna port indication field indicating an antenna port for the component carrier, and
   a carrier indication field indicating the component carrier.

10. The method of claim 9, wherein the additional indication field further includes an uplink-downlink indication field indicating for which link, between an uplink and a downlink, the information field is used as control information.

11. The method of claim 9, wherein the additional indication field further includes a format indication field capable of identifying the M different DCI containers having a plurality of predetermined different bit sizes.

12. The method of claim 8, wherein the additional indication field is mapped to a predetermined fixed location in the DCI container.

13. The method of claim 8,
   wherein each of the M different DCI containers have a different predetermined bit size, and
   wherein the additional indication field is mapped for all of the M different DCI containers with the same position and the same bit size.

14. A user equipment in a carrier aggregation system, the user equipment comprising:
   a radio frequency (RF) unit configured to transmit and receive a radio signal; and a processor coupled to the RF unit and configured to:
  receive bandwidth information of a component carrier; and
  receive downlink control information(DCI) by monitoring M different DCI containers; and
  blind decoding the received DCI,
  wherein the DCI is generated using a DCI format among N different DCI formats which can be used in the component carrier, and the DCI comprises an additional indication field which informs the UE about the DCI format used to generate the DCI,
  wherein the DCI is mapped to a DCI container among the M different DCI containers,
  wherein each of the M different DCI containers has a predetermined bit size in accordance with the bandwidth information,
  wherein at least 2 DCI formats among the N different DCI formats can be mapped to a same DCI container among the M different DCI containers, and
  wherein, if a bit size of the DCI container is greater than a total bit size of the DCI, different bits remaining after mapping the DCI in the DCI container are padded to a bit having a specific value, and
  wherein N and M are natural numbers and M is smaller than N.

* * * * *